(12) United States Patent
Santarsiero

(10) Patent No.: US 11,166,597 B1
(45) Date of Patent: Nov. 9, 2021

(54) TRANSFORMABLE FOOD CONVERSION DEVICE

(71) Applicant: Paul Santarsiero, Avon, CT (US)

(72) Inventor: Paul Santarsiero, Avon, CT (US)

(73) Assignee: Paul Santarsiero, Avon, CT (US)

( * ) Notice: Subject to any disclaimer, the term of this patent is extended or adjusted under 35 U.S.C. 154(b) by 68 days.

(21) Appl. No.: 15/995,421

(22) Filed: Jun. 1, 2018

(51) Int. Cl.
*A47J 43/28* (2006.01)
*A22C 17/00* (2006.01)

(52) U.S. Cl.
CPC ........... *A47J 43/28* (2013.01); *A22C 17/0006* (2013.01)

(58) Field of Classification Search
CPC ..... A22C 9/008; A22C 17/02; A22C 17/0006; A22C 17/0026; A22C 25/20; A47J 17/10; A47J 37/0885; A47J 43/18; A47J 43/28; A47J 43/283
USPC ... 56/400.1, 400.16, 400.12, 400.17, 400.18, 56/400.19, 400.21; 241/169, 287; 294/8.5, 11, 15, 16, 28, 29, 31.1, 50.6, 294/50.8, 55.5, 104–107, 118, 119; D8/4–7, 13
See application file for complete search history.

(56) References Cited

U.S. PATENT DOCUMENTS

| | | | | |
|---|---|---|---|---|
| 2,690,616 A * | 10/1954 | Johnt | ...................... | A47J 17/00 30/304 |
| 3,964,775 A * | 6/1976 | Boyd | ...................... | A01B 1/18 294/16 |
| 4,202,502 A * | 5/1980 | Laska | ...................... | B02C 18/36 241/82.5 |
| 4,393,588 A * | 7/1983 | Kowalski | ................ | B26B 13/06 241/168 |
| 4,966,332 A * | 10/1990 | Laska | ...................... | B02C 18/20 241/199.12 |
| 4,969,267 A * | 11/1990 | Anenberg | ................. | B26B 3/04 30/304 |
| 5,245,902 A * | 9/1993 | Pereira | ................... | B26D 3/185 83/425.3 |
| 5,359,840 A * | 11/1994 | Costar | ...................... | A01D 7/00 172/378 |
| 6,340,490 B1 * | 1/2002 | Owens | .................... | A01J 27/04 241/282 |
| 7,080,455 B1 * | 7/2006 | Ronan | ...................... | B26B 1/02 30/122 |

(Continued)

*Primary Examiner* — William V Gilbert

(57) ABSTRACT

An interdependent pair of kitchen tools designed for cutting, shearing, gouge cutting, or shredding specific meat and fibrous vegetables such as squash and slow cooked meats, along with leafy greens, deli meats, and hardboiled eggs. The tools exist as two forklike subassemblies, each comprised of respective distal handles, distal tine arrays, and pivotally enabled geometries. The subassemblies exist in two functional states allowing for two food conversion user modalities. The first functional state exists as a disconnected state amongst the subassemblies wherein the first user modality features opposing linear forces levied from respective subassemblies onto foods residing on a horizontal surface. The second functional state exists as a pivotally interconnected state amongst the subassemblies, whereby the second user modality features opposing pivotal mechanical forces levied from interconnected subassemblies onto foods residing on a horizontal surface or alternately contained within a custom food containment assembly existing as part of this disclosure.

14 Claims, 12 Drawing Sheets

(56) References Cited

U.S. PATENT DOCUMENTS

| | | | | |
|---|---|---|---|---|
| 7,143,677 | B2 * | 12/2006 | Zeder | B26D 3/283 |
| | | | | 83/698.11 |
| 7,661,258 | B1 * | 2/2010 | Petruzelli | A01D 7/10 |
| | | | | 56/400.12 |
| 8,191,949 | B2 * | 6/2012 | Spaulding | B26B 13/22 |
| | | | | 294/118 |
| D663,171 | S * | 7/2012 | Borovicka | D7/683 |
| D781,114 | S * | 3/2017 | DeAsis | D7/684 |
| 9,624,631 | B2 * | 4/2017 | Baker | E01H 1/1206 |
| D836,410 | S * | 12/2018 | Payne | D7/666 |
| 2002/0020067 | A1 * | 2/2002 | Silver | B26B 13/00 |
| | | | | 30/226 |
| 2009/0322108 | A1 * | 12/2009 | Bina | A47G 21/10 |
| | | | | 294/99.2 |

* cited by examiner

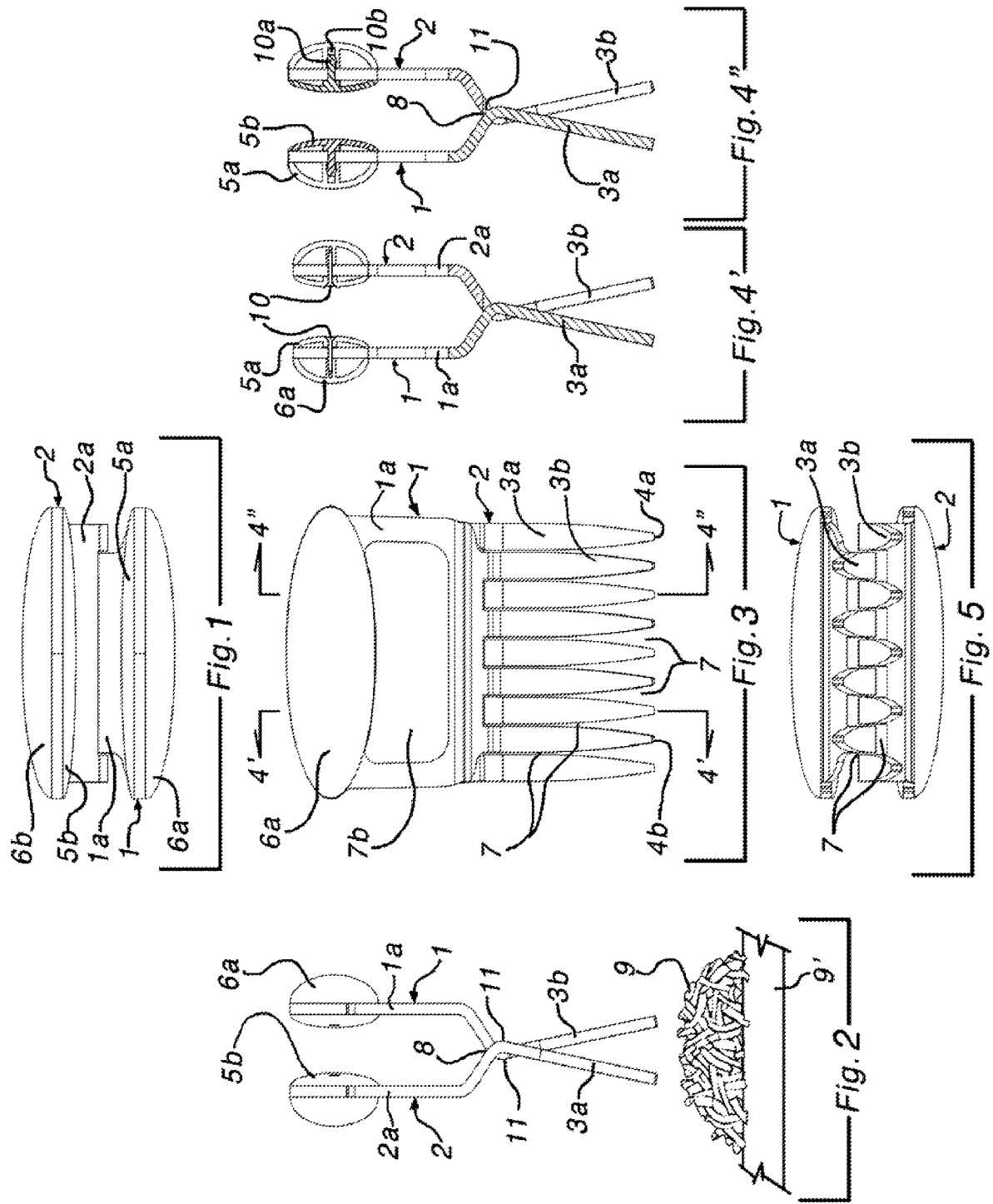

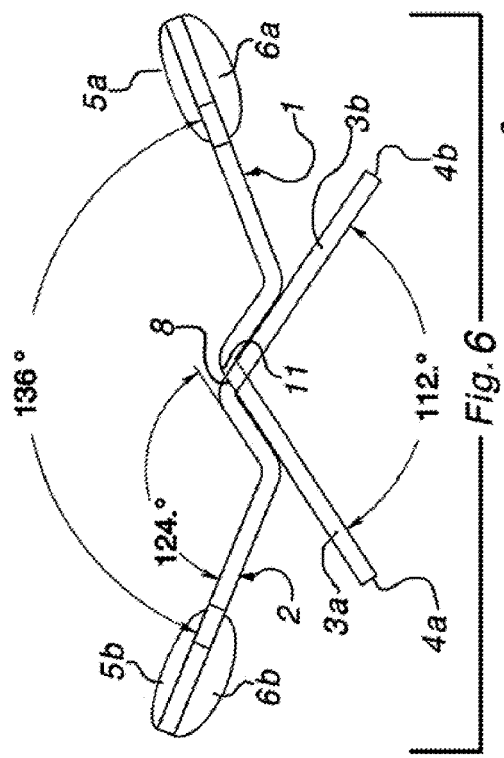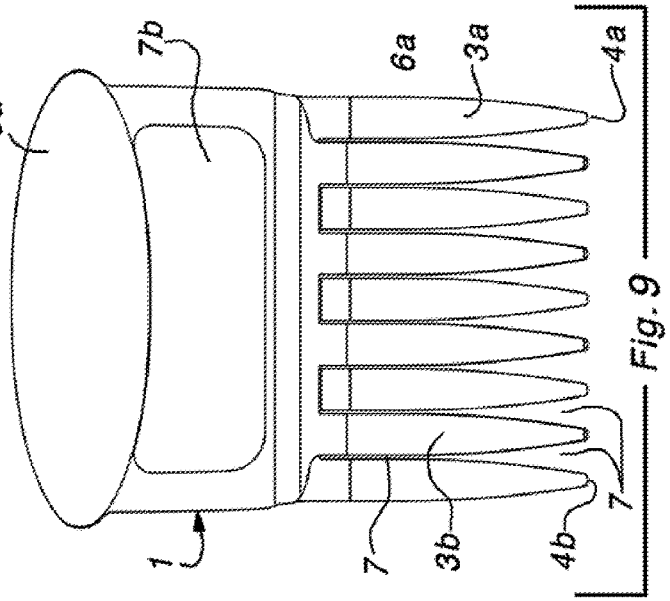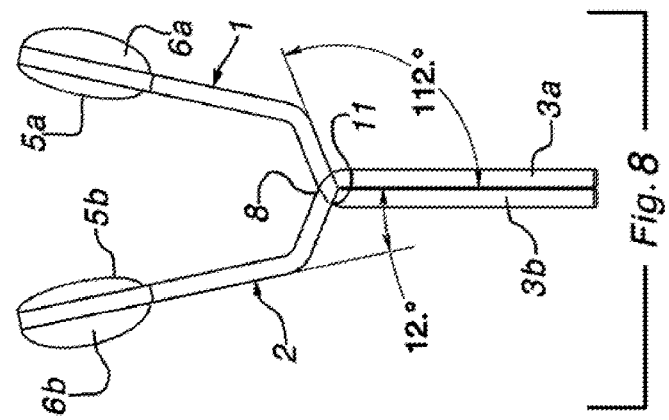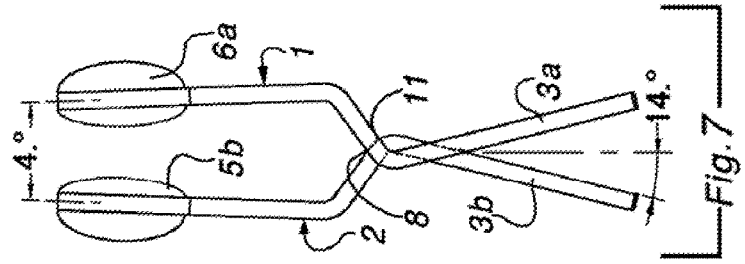

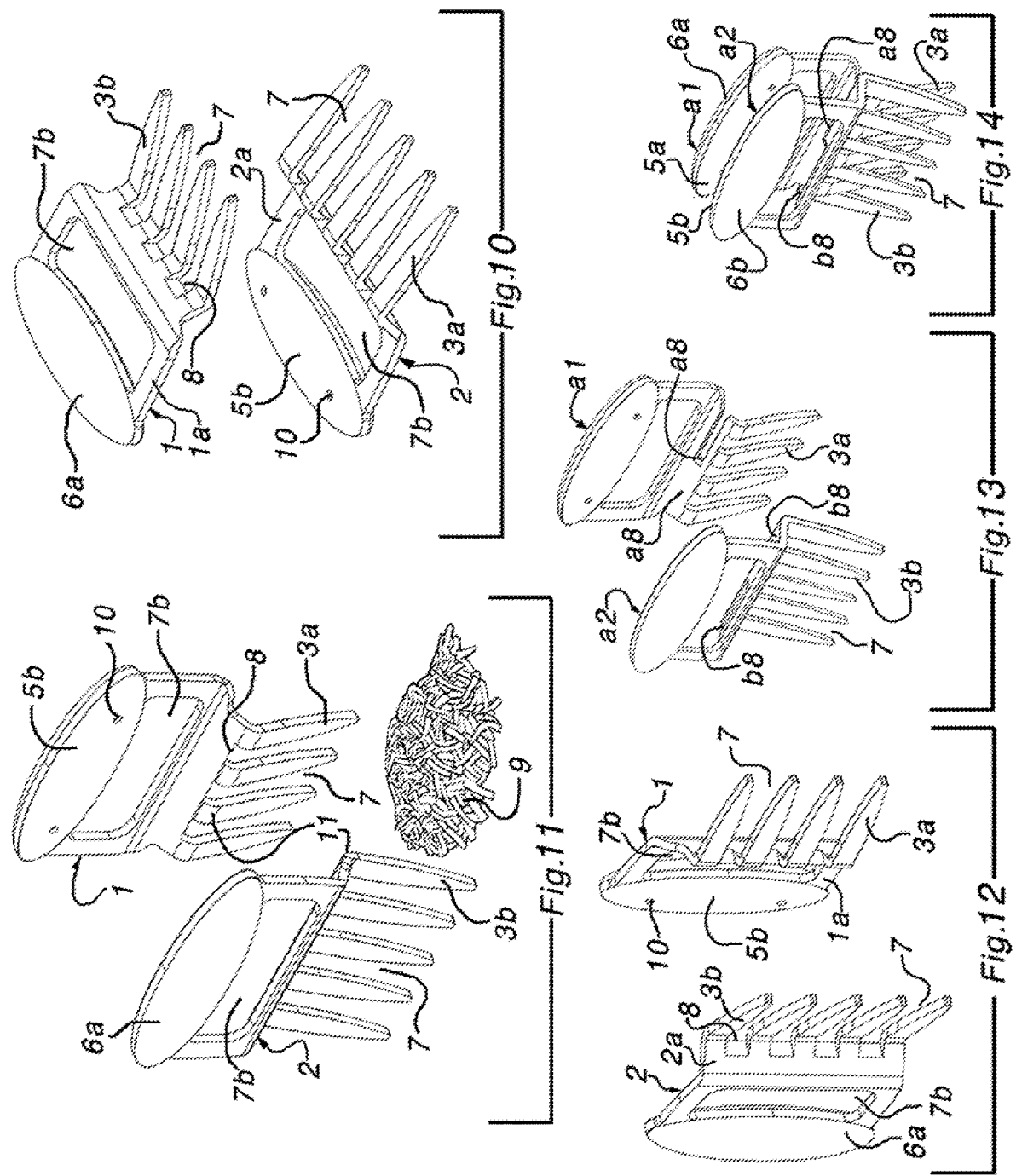

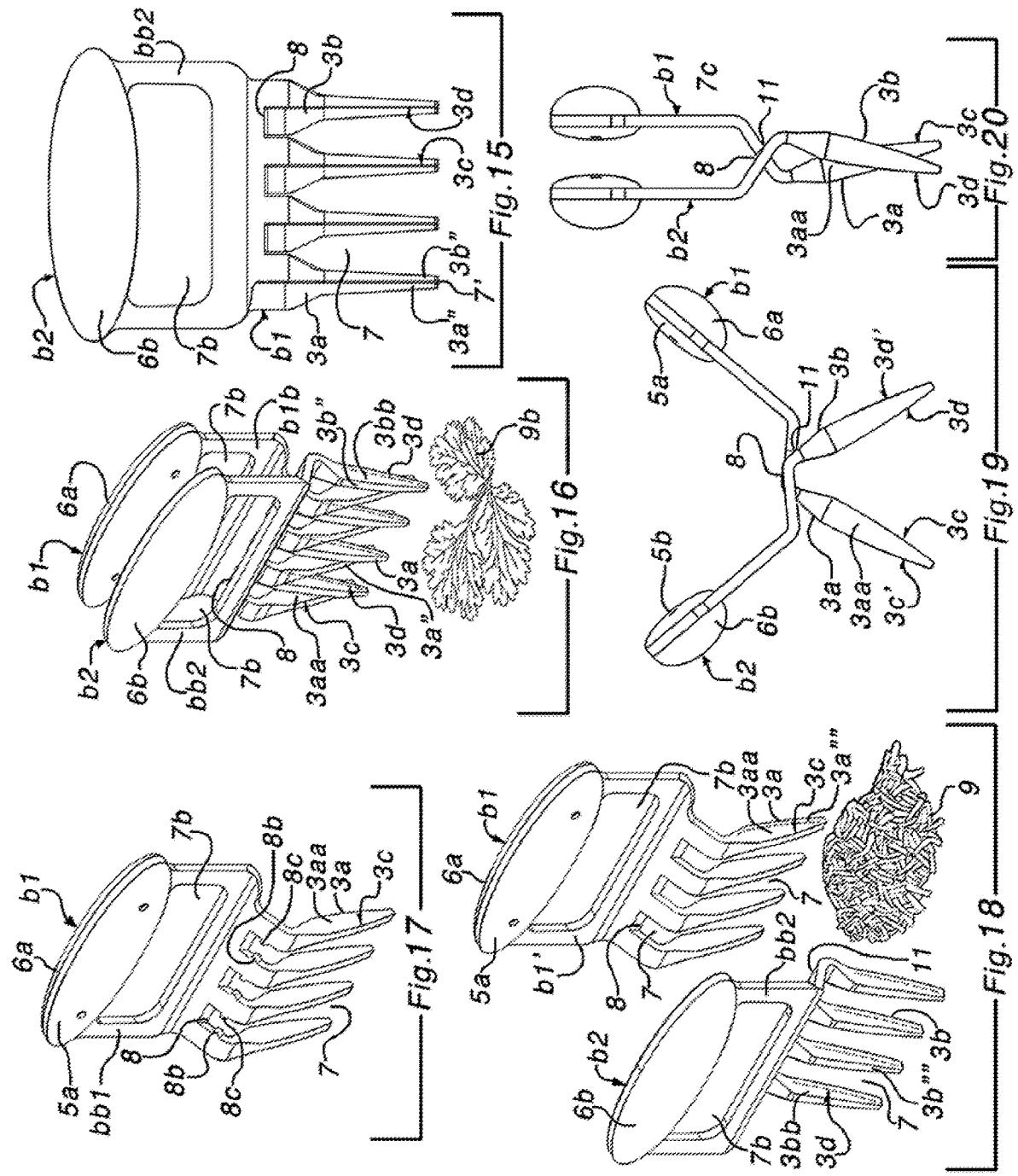

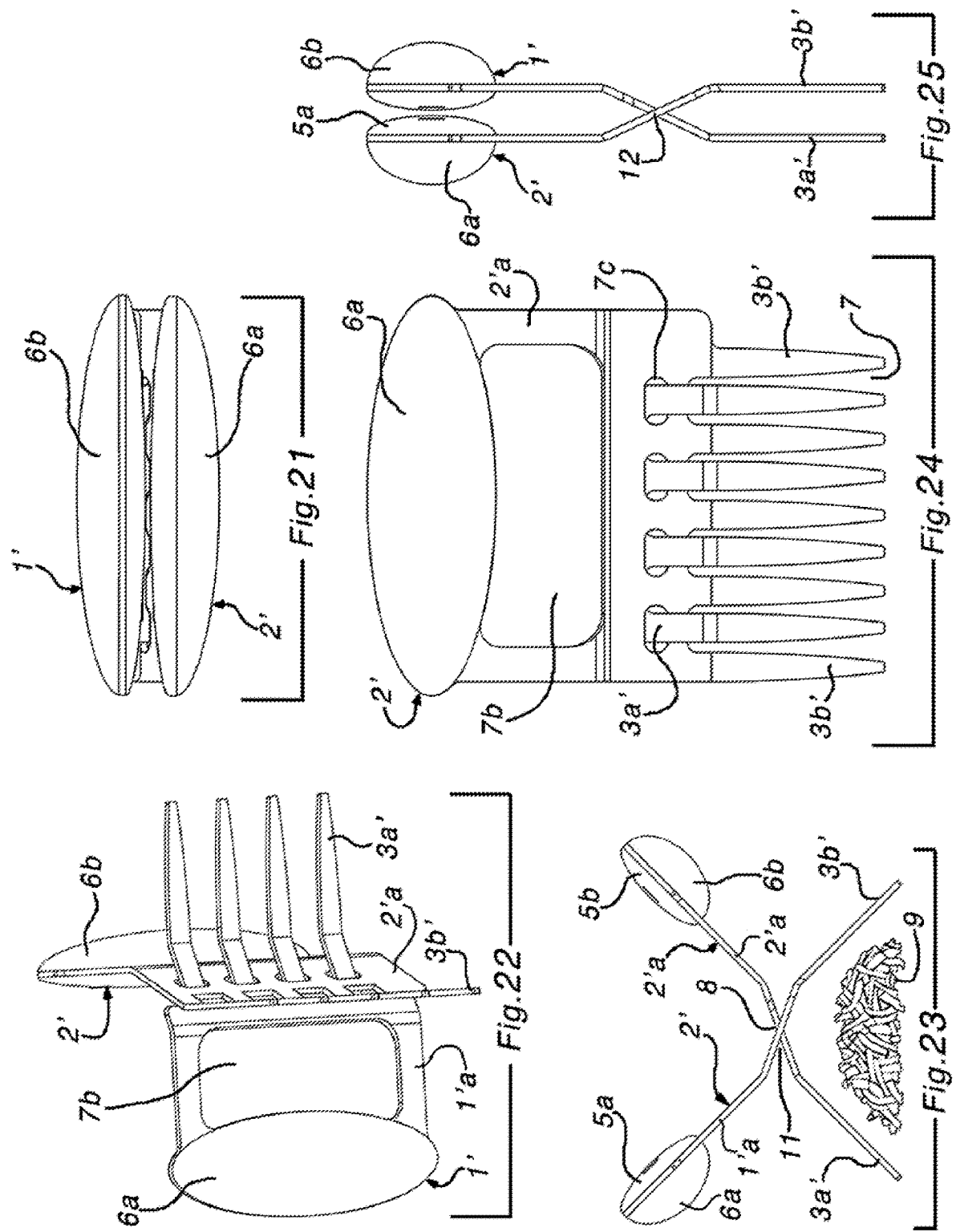

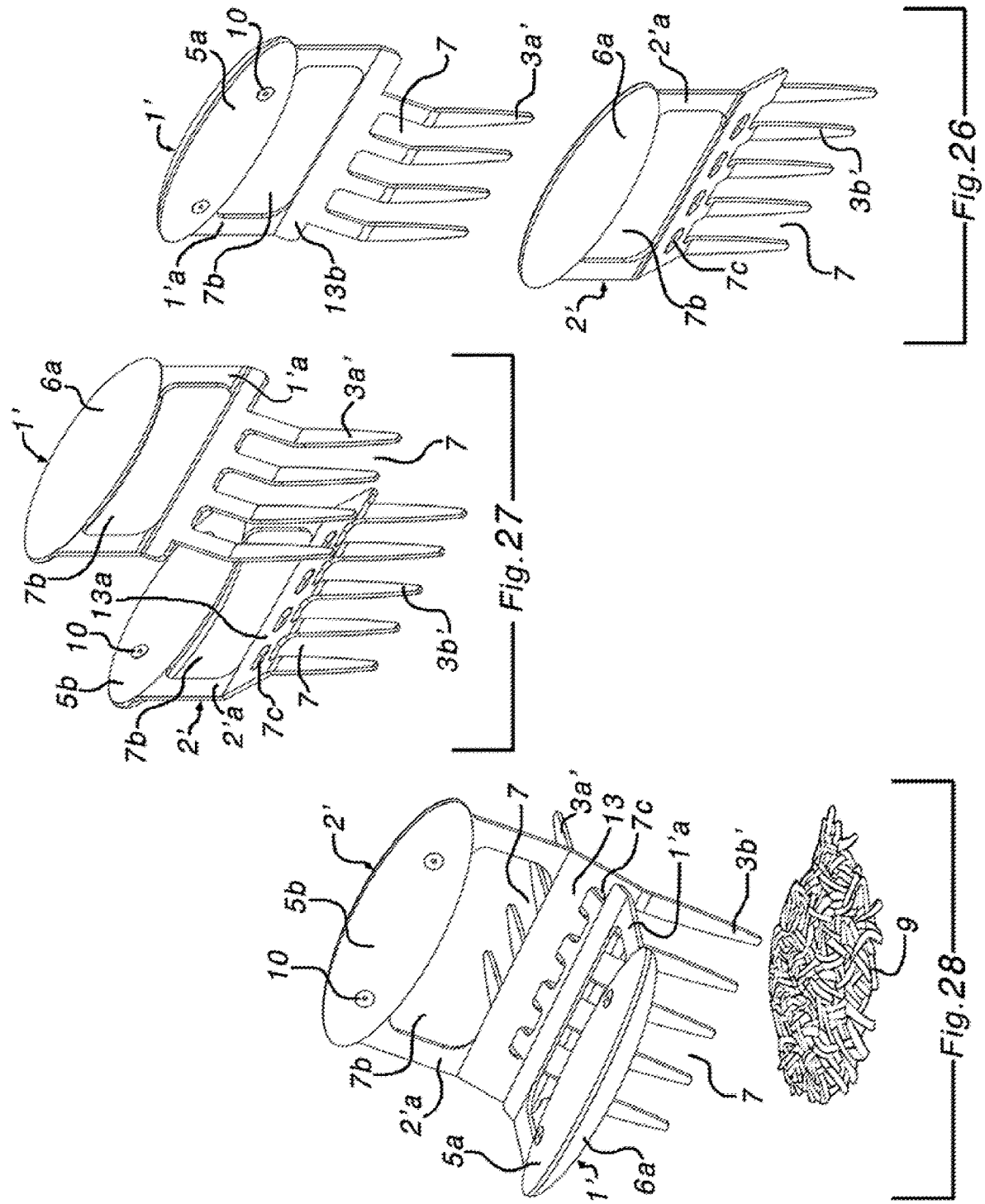

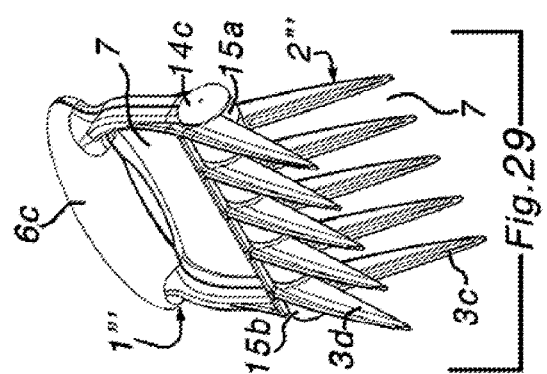
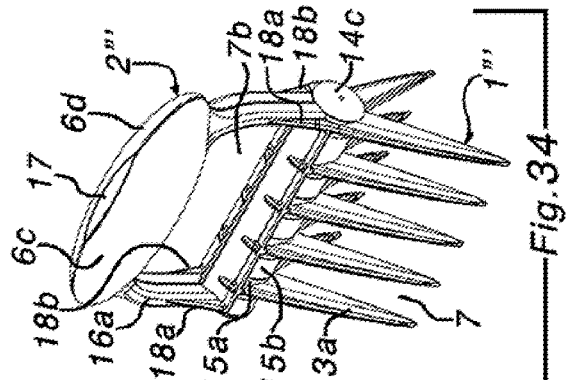
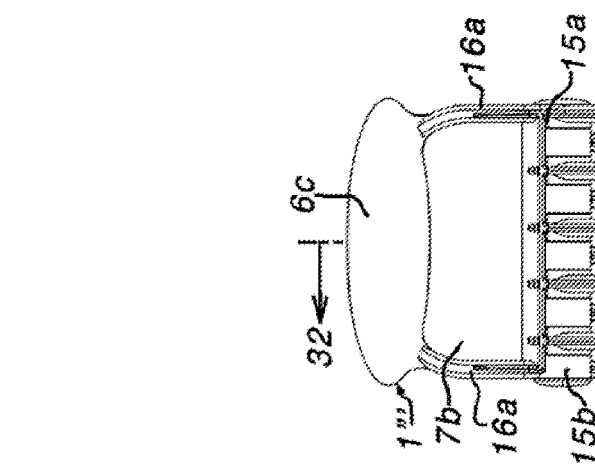
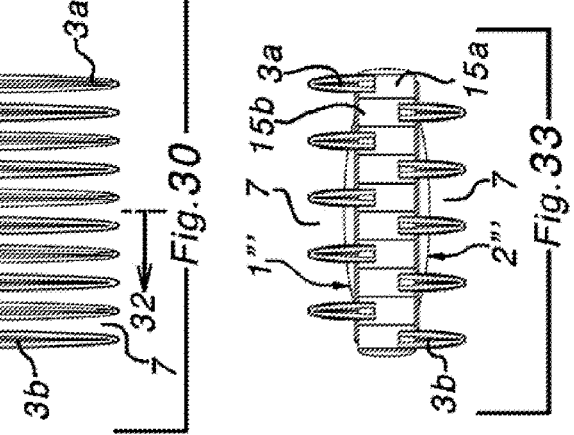
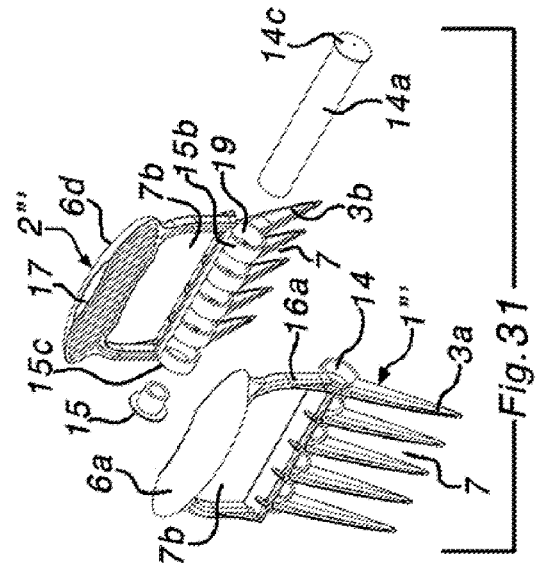
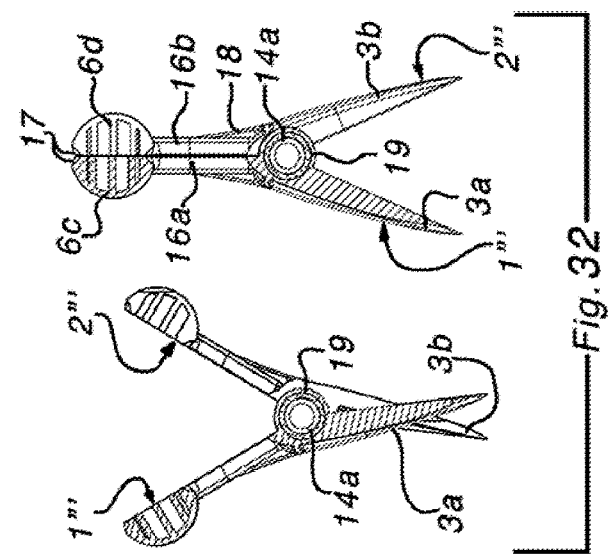

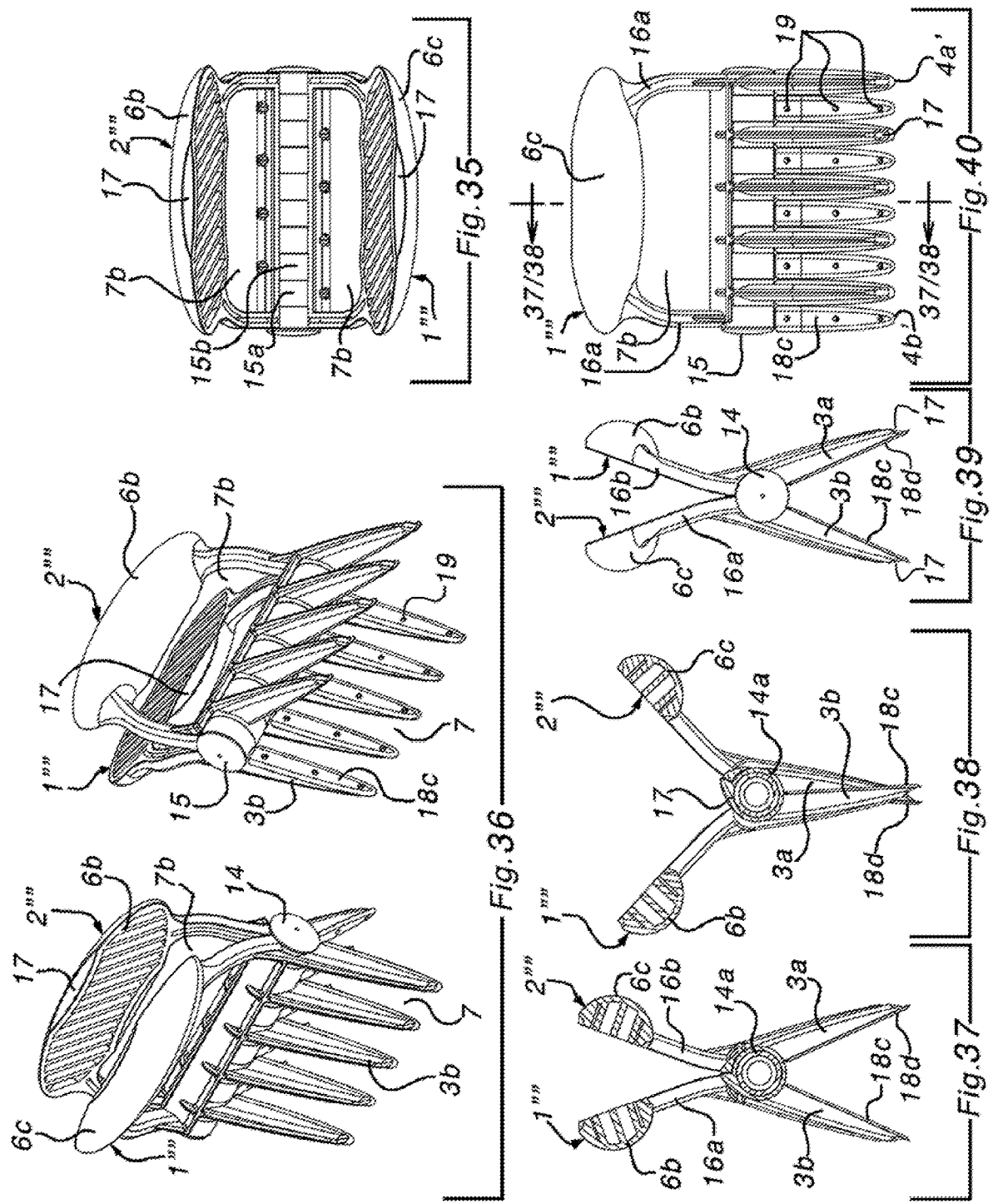

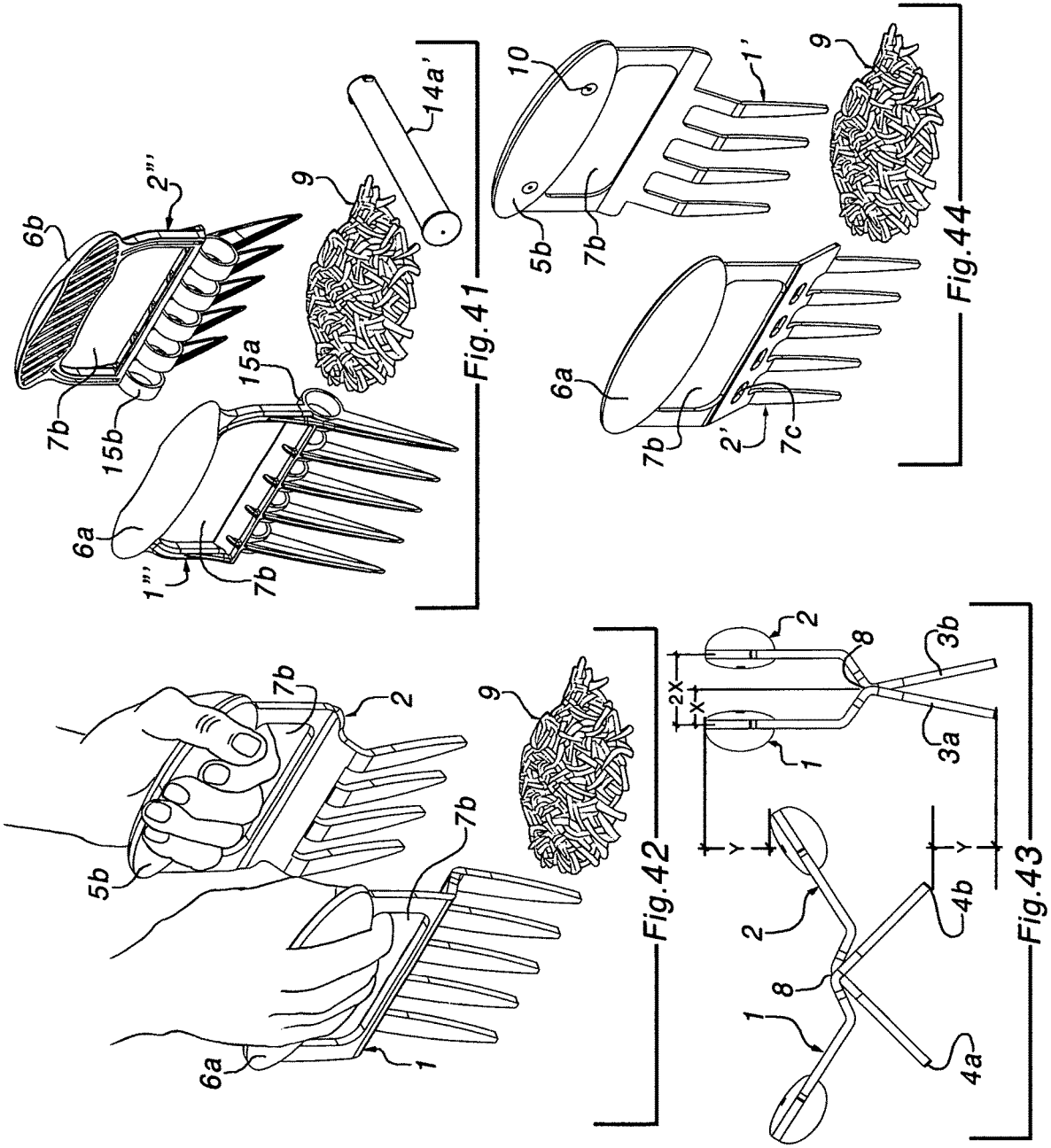

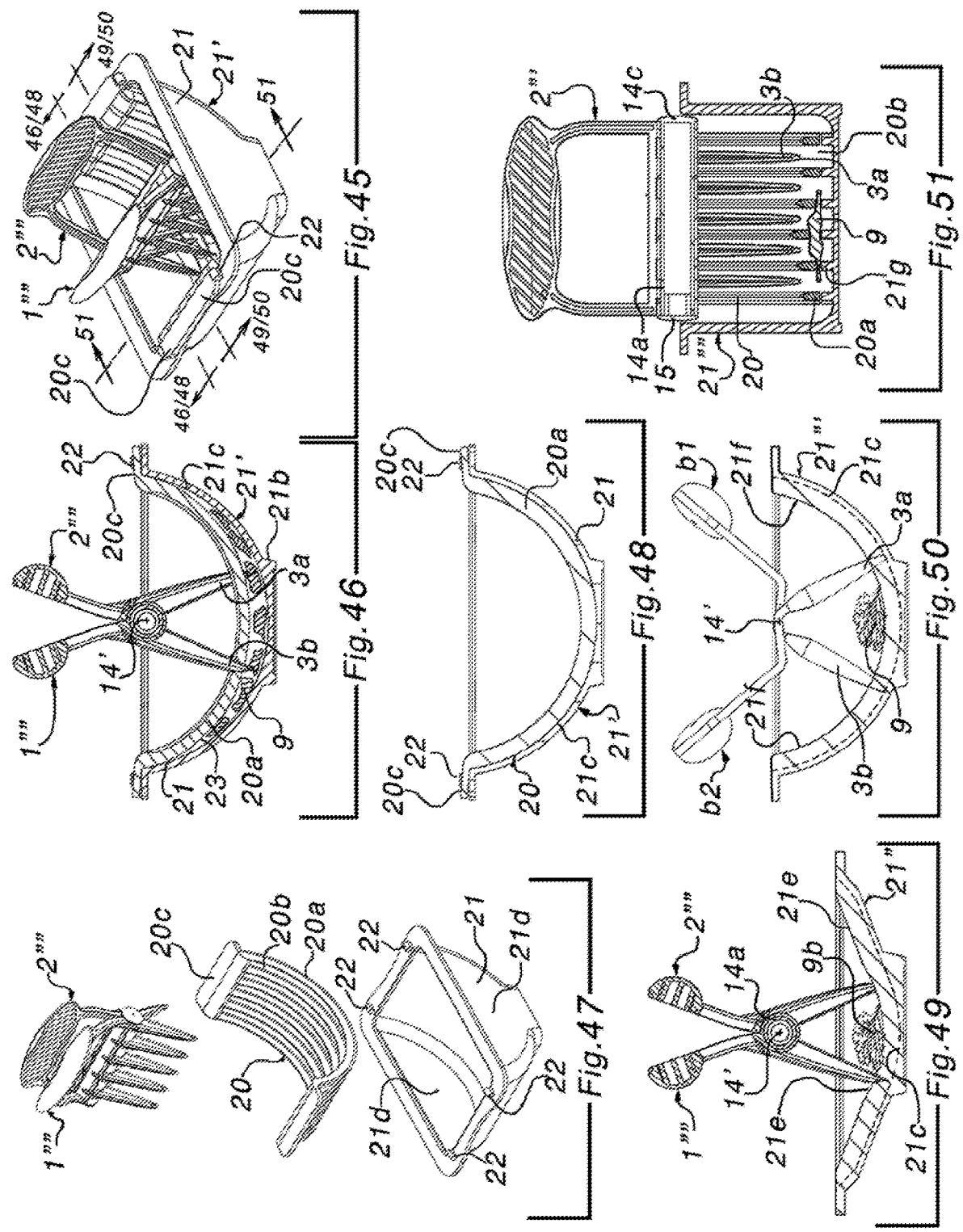

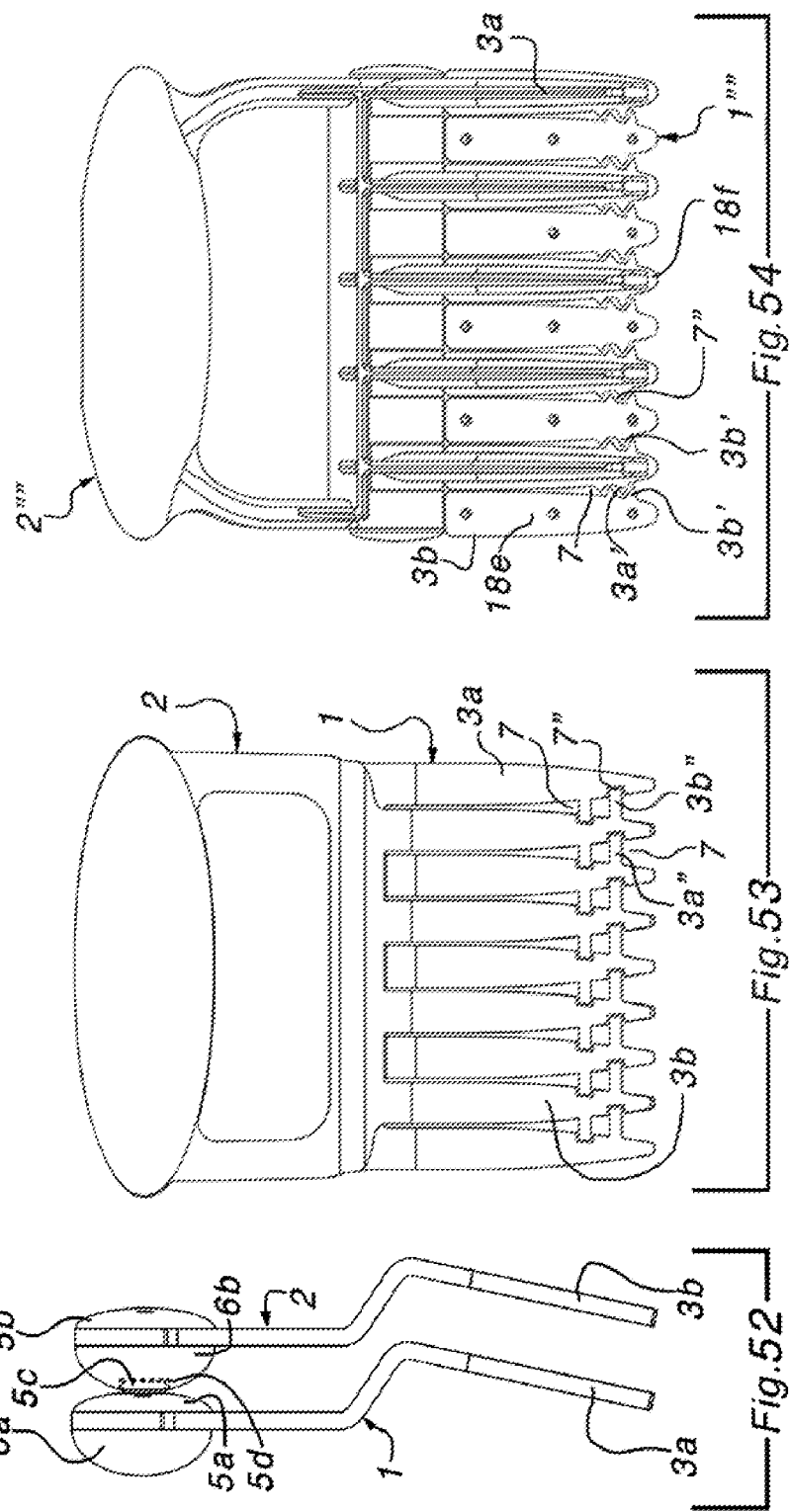

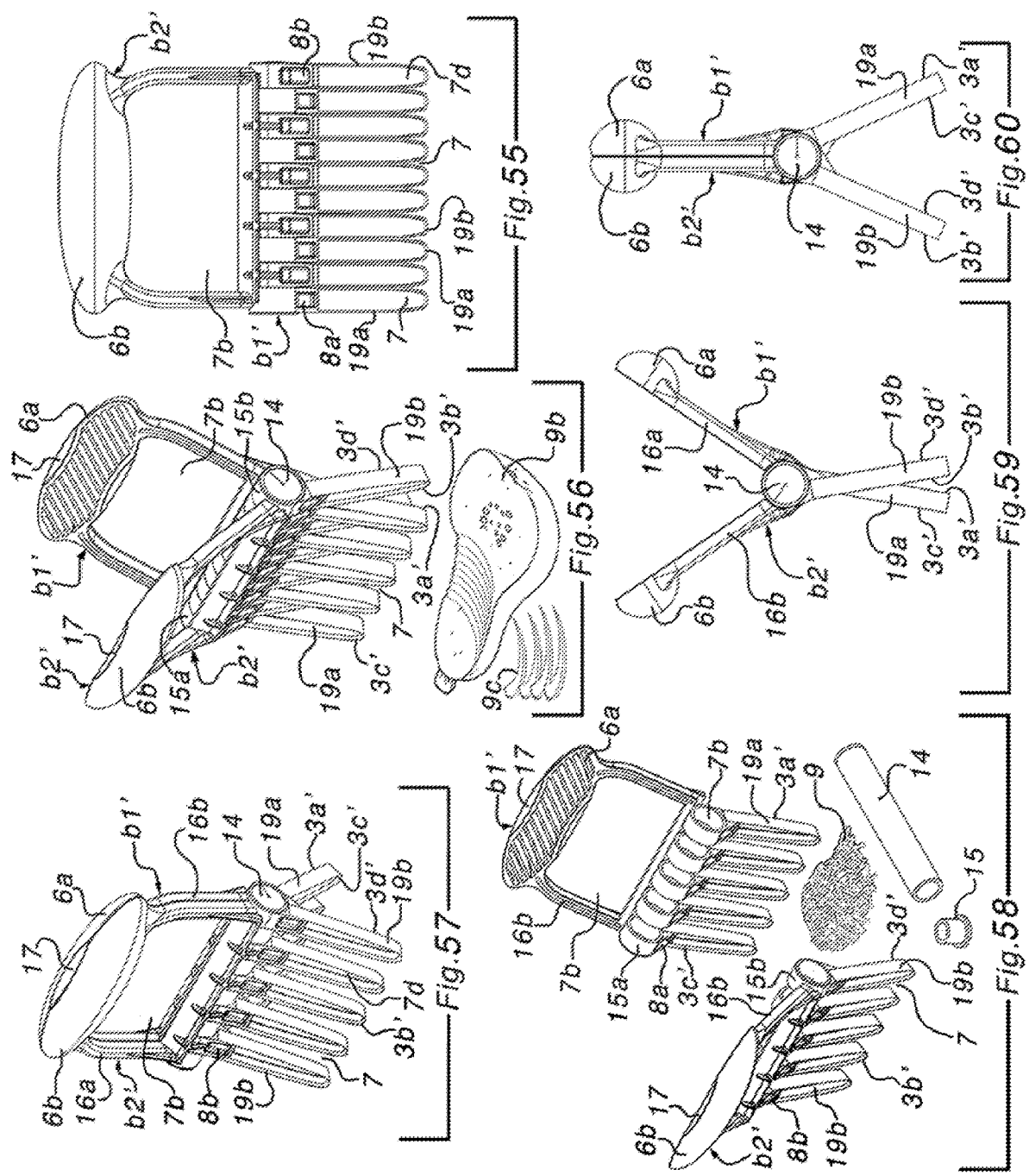

TRANSFORMABLE FOOD CONVERSION DEVICE

SUMMARY OF THE INVENTION

It is well known to chefs and home cooks alike, that various home recipes and restaurant dishes require the use of specialized kitchen preparation tools. The invention allows cooks and chefs a unique kitchen tool, which in it's preferred embodiments, can be used to cut, shred and shear meat, fibrous vegetables, and in some instances its functionality can extend to conversions that include fibrous fruits, nuts, hardboiled eggs, legumes, and yet to be discovered food types. The invention solves a cooks need to have one kitchen tool which is able to shred large family portions of meats and vegetables while simultaneously addresses their need to have a kitchen tool to employ for converting smaller, and sometimes more sinuous portions of these same food types. The disclosed preferred embodiments of the invention function between two transformable use modalities, so as to address both of these afore mentioned cutting, shredding and shearing needs. The first intended use features a gross portion food conversion function and is achieved through the invention being comprised of two, disconnected, sub-component tools with distal fork ending. In this operational mode, the invention performs a function similar to present day meat claw shredders, but with an enhanced shearing means afforded by way of high tolerance intersecting tangencies amongst the pair of kitchen tools fork portions. In its second intended use, the invention has a simple and intuitive interlocking convertible configuration, which allows for finer mechanically enhanced, cutting, shredding and shearing of a chosen food type.

The plurality of intended uses modalities and the ability to easily transform between them, offers the cook an efficiency of having one kitchen tool that can be employed for a majority of their manual cutting, shredding and shearing food conversion tasks. The invention will save valuable time for the user by performing cutting, shredding, shearing and mincing tasks with greater speed and ease when compared to present tools on the marketplace, or when compared to a common alternate method of employing a knife to convert food types into finer compositional detail. In a preferred embodiment, while the invention exists in a pivotally enabled interconnected state, the two main components each contain an array of outward extending food conversion tines, whereby said arrays exist in laterally opposing axial face orientations to one another. Handle portions of respective main components are located at distal opposing ends to the tine array respective location. A lateral offset to their respective handle portions allows the user to securely grip onto the main components with each hand, while respective tines arrays pivotally and sequentially intersect amongst one another. When employed in a food conversion task, there exists a dynamic pivotal range of motion amongst the invention's main components wherein repeated pivotal sequencing of their respective tine arrays allow for unique food conversions having multiple shearing, shredding, and cutting exposure forces applied to a chosen food type that exists amongst and between respective sets of tine arrays. The invention offers cooks sequential, dual food conversional functions, whereby it's second intended use's convertible configuration, addresses a cook's need to affect smaller and more sinuous food types that may have already had a first gross motion shredding levied onto them, but require a pivotal mechanical assist to achieve a desirable finer composition.

The invention's second intended use affords the cook a mechanical lever to employ against food types allowing for increased strength, ease of use, and finer shredding. Food portions chosen for this mechanically enhanced pivotal shredding may have undesirable fibrous consistency, burnt surfaces, or toughness sometimes exhibited by food taken right from the smoker, grill, oven, or other cooking device.

When barbequing or cooking meat at high temperatures, charred and fibrous portions may also require further shredding from a second intended use modality of the invention to allow for a more desirable palatability level to the chosen food type. The present state of the art for handheld kitchen shredding tools and meat pullers does not address a cook needs to have a finer end consistency for their food types. The second intended use's inherent pivotal utility, easily converts the toughest meats and other food types into smaller fibers. In most instances, it is desirable for the cook to precook, fully cook, or slow cook a meat style food type before being effected by either of the two intended use modalities that the invention allows. It is also envisaged that there are food types that can be successfully shredded by this invention without the need for cooking and may be affected by the invention in their raw state. This raw state may include specific fruits, nuts, vegetables, herbs, and leafy greens. The disclosed third and sixth preferred embodiment for the invention will describe variations, which allow the invention to be employed for cutting herbs, and leafy greens through variations contained in their tine array portions.

It is well known that when various meats and vegetables are cooked for a long enough period of time and at a desired consistent temperature, they become softer and thereby their fibers are more easily separated. In most cases, it is at this point in the cooking sequence, that the invention would be employed to perform the desired food conversion, allowing the cook to employ either the invention's first gross motioning conversion modality or the second, finer level of shredding and cutting which employs the mechanical lever assist in its configuration. A gouge-cut type of food conversion that is employed by the seventh preferred embodiment of the invention, and further described in this disclosure, would convert a food type while it exists in a raw, uncooked state an convert it to a having a strand like consistency.

The invention addresses the deficiencies witnessed in existing food conversion devices by providing a convertible shredding and shearing device for both large and small-scale manual shredding needs. The user can quickly convert between the disconnected main component shredding and an interconnected pivotal, mechanically assisted shredding means. During interconnected pivotal shredding the invention's two main components exist in a pivotally enabled interconnected state, allowing each to remain in a pivotally secure state as tensile and/or compressional forces are levied upon a food type located between or amongst their respective tine arrays. The two main components pivot about one another to create mechanical leveraged forces necessary to cut, shred and shear food that is placed between their respective tine arrays. In a preferred embodiment, the invention's two main components are not identical or fully symmetrical to one another, but instead are designed to have their individual respective tines engage into the opposing main components open space areas located between opposing adjacent pairs of singular tines. In the first through forth preferred embodiment for the invention, which are further disclosed within, their respective pivotally enabled interconnected states employ pivotal tensile and/or compressional forces to be levied onto a chosen food type, which are contained amongst their respective tine arrays and these forces help to retain the axially opposing interconnected main components in their pivotally enabled state. A mechanical lever exists for each of the first through forth preferred embodiment for the invention at a proximal location amongst their respective main components, which is further defined as being located along a substantially shared axis contained within shared opposing lateral tangencies amongst the two main component pairings. In the said embodiments, at least one respective upper portion tine array, or a proximal planar area in the case of the second preferred embodiment, secures the two main components while user levies inwardly and/or outward opposing pivotal forces onto the interconnected main components. These main components easily separate and pull apart from one another to exist in their disconnected state during the absence of said interconnected forces.

THE PRESENT INVENTION

A pair of interdependent kitchen tools having two functional modalities for converting a foods composition that previously existed as being undesirable for consumption. Food types chosen to be converted by the invention may exhibit a texture that is exceedingly tough, fibrous, sinuous, may be too large to effectively be consumed, or may exist in an elemental solid state whereby the user wishes to convert it to a puréed or semi-liquefied state. The pair of interdependent tools easily transform between their two intended use modalities. The first intended use involves the pair of tools being employed in a disconnected state to manually separate the fibers contained in a chosen food type. When the user converts the pair of tools to their second intended use, which is comprised of a pivotally enabled interconnected state amongst the tools, the user applies opposing pivotal forces wherein each individual tool's respective tine arrays sequentially engage into the opposing open spaces between singular tines of opposing respective tine arrays. Said opposing pivotal forces are further described as user semi rotational and semi counter rotational pivotal forces, which share a substantially common pivotal axis amongst the interconnected tools. This substantially common pivot axis exists at lateral tangencies amongst respective tools, which are located at a substantially central portion of the respective tools, and in-between the tools distal handle portion and its distal tine arrays. The invention's food conversion functionality can be further described as an interdependent pair of kitchen tools which consist of respective tine arrays which pivot sequentially amongst respective opposing tine arrays, intersecting into the opposing respective open space arrays amongst axially opposing singular kitchen tools of said kitchen tool pair. Some of the disclosed embodiments of the invention integrate factory applied comfort handles securely located to the singular kitchen tools respective distal portions whereby said handles are dishwasher safe and ergonomic for the benefit of the end user. It is also envisaged that the comfort handles can alternately be formed integral to the plastic, steel or stainless steel main components. These handles exist in a preferred state as being manufactured of injection-molded plastic. The main two subcomponents of the first through forth preferred embodiment for the invention are envisaged in a preferred state to exist as being manufactured of electroplated tempered steel or stainless steel through a manufacturing method of die cutting, plasma cutting, laser cutting or metal sintering technologies as the latter may become more widespread and affordable. Some of the disclosed embodiments of the invention are comprised of main subcomponents manufactured of injection-molded food safe engineering plastic. Alternate food conversion modalities and configurations for the invention are further described within whereby the invention may be employed to cut and sever leafy vegetables, herbs, and thinner food types with the addition of an interdependent food containment vessel assembly, and yet in another modality, the invention is configured to be used to scoop out linear strands from specific uncooked food types, converting them into gouged-cut, linear extending food pieces.

The following illustrative drawings and detailed descriptions make the foregoing and other objects, features, and advantages of the invention more apparent.

BRIEF DESCRIPTION OF THE ILLUSTRATED EMBODIMENTS

FIG. 1 illustrates a first preferred embodiment of the invention in an orthographic top view and existing in a pivotally enabled interconnected state.

FIG. 2 shows the invention in an orthographic side view comprised of said subassembly 1 and said subassembly 2, interconnected, and ready for the invention's second intended use.

FIG. 3 shows a front orthographic view of subassembly 1 and subassembly 2, existing in said pivotally enabled interconnected state, with tangencies amongst them at respective tine.

FIG. 4' and FIG. 4" depict two alternate lateral sectional views of said subassembly 1 and said subassembly 2 existing in said pivotally enabled interconnected state and comprised of a pair of comfort handle parts.

FIG. 5 illustrates a bottom orthographic view of subassembly 1 and said subassembly 2 existing in said pivotally enabled interconnected state amongst said subassemblies.

FIGS. 6 and 7 both depict side orthographic views for said subassembly 1 and said subassembly 2 in said pivotally enabled interconnected state and further illustrate the two respective full range of pivotal motion limits for said subassemblies further defining said assemblies opposing dynamic pivotal range.

FIG. 8 illustrates a side orthographic view for said assemblies depicted in said pivotally enabled interconnected state and with a substantially vertical orientation existing amongst said tine arrays.

FIG. 9 illustrates a front orthographic view for said assemblies whereby said pivotally enabled interconnected state exists with a vertical orientation of said tine arrays.

FIGS. 10, 11, 12, illustrate said assembly 1 and said subassembly 2 in a disconnected state and further depicts respective tine arrays along with the plurality of open spaces, which comprise.

FIG. 13 illustrates a second preferred embodiment for the invention whereby a first subassembly a1 and a second subassembly a2 are in a disconnected state and whereby they are comprised of newly introduced geometries amongst said subassemblies.

FIG. 14 illustrates said first subassembly a1 and second subassembly a2 secured in an opposing simultaneous intersection with one another to form said modified interconnected state.

FIGS. 15, 16, 17, 18, 19 and 20 illustrate a third preferred embodiment for the invention, which includes subassembly b1 and subassembly b2. Said subassemblies are substantially similar subassemblies to the subassemblies disclosed in the first preferred embodiment of the invention, differing whereby the depicted subassemblies b1 and b2 have additional shared pivotal tangencies amongst pairs of axially opposing respective singular tines.

FIGS. 21, 22, 23, 24, and 25 illustrate a fourth preferred embodiment for the invention whereby the tine array of first subassembly 1' intersects into the opposing second subassembly 2' at the laterally equally spaced-apart plurality of open spaces.

FIG. 26 and FIG. 27 depict said first assembly 1' and said second assembly 2' in partial exploded views.

FIG. 28 illustrates said first subassembly 1' and said tine array 3b' intersecting at the said plurality of open spaces located on said second subassembly 2' whereby said subassemblies are depicted in a fully open pivotal range limit while existing in said pivotally enabled interconnected state.

FIGS. 29, 30, 31, 32, 33 and 34 show a fifth preferred embodiment for the invention constructed of four (4) molded parts; a first member part 1''', a second member part 2''', and a linear axle part.

FIGS. 35, 36, 37, 38, 39 and 40 illustrate a sixth preferred embodiment for the invention being comprised of said members parts as disclosed in the above said fifth preferred embodiment of the invention, with the inclusion of a plurality of laterally planer, steel or stainless steel, tine inserts.

FIG. 41 depicts a perspective view of a substantially similar but modified, fifth preferred embodiment of the invention, comprised of first member part 1''', second member part 2''' and depicted in a disconnected state. Said modified fifth preferred embodiment utilizes an alternate removable linear axle part.

FIG. 42 illustrates a disconnected in-use state of said first preferred embodiment of the invention comprised of said first subassembly 1, said second subassembly 2, and depicts a chosen food type in a preferred central orientation.

FIG. 43 depicts a side orthographic view of the pivotally enabled interconnected state of said preferred first embodiment of the invention comprised of said first subassembly 1 and said second subassembly 2.

FIG. 44 illustrates a perspective view of said preferred fourth embodiment of the invention comprised of subassembly 1', said subassembly 2' existing in a disconnected state, and depicting a chosen food type in a preferred orientation of being located on a horizontal food preparation surface.

FIGS. 45, 46, 47, and 48 illustrate an alternate enhanced functional modality for said food conversions wherein one of the previously disclosed preferred embodiments of the invention function in an interdependent food conversion modality with a newly introduced food containment member.

FIG. 49, FIGS. 50, and 51 illustrate two containment members that are substantially similar to the previously disclosed containment member and form modified containment members.

FIG. 52 illustrates a side orthographic view for a modification to said preferred first embodiment which is comprised of a post and a cavity to allow for interconnecting said subassemblies for storage.

FIG. 53 depicts a front orthographic view of an alternate embodiment for the previously disclosed first preferred embodiment for the invention whereby said tine arrays have distal laterally extending end arrays comprised of newly introduced profiles.

FIG. 54 depicts a front orthographic view of an alternate embodiment for the previously disclosed sixth preferred embodiment of the invention which employs a similar user function to that of said alternate embodiment disclosed in FIG. 53.

FIGS. 55, 56, 57, 58, 59, and 60 illustrate a seventh preferred embodiment for the invention, being comprised of similar upper portion members parts as disclosed in the above disclosed said fifth preferred embodiment of the invention, but with the addition of a plurality of u-shaped, steel or stainless steel tines.

DETAILED DESCRIPTION OF THE ILLUSTRATED EMBODIMENTS

FIG. 1 illustrates a first preferred embodiment of the invention in top view and depicts the invention being comprised of two main components, a first subassembly 1 and second subassembly 2 wherein both are depicted in a pivotally enabled interconnected state. Said pivotally enabled interconnected state includes said first subassembly 1 and said second subassembly 2 existing in an axially opposing lateral facing to one another. FIG. 1 also depicts each said subassemblies 1 and 2 having respective handle portions comprised of two parts. First subassembly 1 said handle portion is comprised of an inner part 5a and an outer part 6a. The second subassembly 2 has a handle portion comprised of an inner part 5b for component and 6b. Said subassemblies 1 and 2 are further comprised of fork member parts 1a and 2a, which in their preferred embodiment, are manufactured of stamped nickel plated hardened steel or stamped stainless steel. It is within the scope of this disclosure that alternate preferred materials and manufacturing processes exist and may be considered when specifying materials and processes for any of the preferred embodiments of the invention disclosed within.

FIG. 2 illustrates said first preferred embodiment for the invention in a side view whereby the first subassembly 1 and the second subassembly 2 are intersected amongst one another in the same proximity to one another as depicted in FIG. 1. FIG. 2 also depicts the invention above a typical food type 9, being located in a preferred orientation to the invention and on a food preparation surface 9'. In this FIG. 2 depiction, the invention is ready for it's second intended use, defined as a mechanically enhanced food conversion functionality whereby the axial opposing said handle portions would first be opened by pivoting them away from one another. Next, the user would position the laterally fully open distal tine arrays 3a and 3b of the subassemblies 1 and 2 into the food type 9, and next forcibly pull the said handles portions toward one another causing the tine arrays 3a and 3b to exert mechanical forces onto the food type 9. Said assemblies 1 and 2 intersect amongst one another in a puzzle-like arrangement. This said intersection is comprised of said subassemblies sets of respective tine arrays 3a and 3b, interlocking amongst the respectively opposing open space arrays 7 which exist between adjacent singular tines of said respective tine arrays 3a and 3b. The pivotal enabled tangency amongst said subassemblies 1 and 2 exists at tangency positions 8 and 11 whereby their respective tine arrays 3a and 3b, intersect into each others said open spaces 7 and comprise said pivotally enabled interconnected state. Said pivotally enabled state is further comprised of a substantially common axis for their combined dynamic pivotal ranges and which exist at said tangency positions 8 and 11. This said pivotal range exists when said subassemblies are interconnected and allows for a finer and more forceful food conversion means. Said pivotally enabled interconnected state is comprised of an integral lever allowing for user initiated mechanical forces to be levied onto a chosen food type 9. The mechanical forces are employed through the invention's said pivotal interconnected state having a fulcrum and lever as formed when said assemblies 1 and 2 are intersected as depicted in FIG. 2. It is envisaged by way of this disclosure that an outward pivotal food conversion sequence includes the user pivoting the respective handle portions of the interconnected said subassemblies 1 and 2 closest to one another while inserting respective distal tine arrays 4a and 4b into a chosen food type, and whereby the user would next pull the handle portions away from one another to effect a pulling type shredding force amongst opposing said tine arrays 3a and 3b and wherein the composition of the chosen food type 9 would be converted. An inward pivotal food conversion sequence includes the user pivoting the respective handle portions of the interconnected said subassemblies 1 and 2 away from one another while inserting respective distal tine arrays 4a and 4b into a chosen food type, and whereby the user would next pull the handle portions towards one another to effect a pushing shearing force amongst opposing said tine arrays 3a and 3b and wherein the composition of the chosen food type 9 would be converted. The user can choose to sequentially and repeatedly motion said interconnected subassemblies 1 and 2 in semi rotational and semi counter rotational directions whereby pulling and pushing forces are levied onto said handle and tine arrays portions to achieve a desired food conversion result and further define a dynamic sequencing amongst said subassemblies 1 and 2.

It is envisaged by way of this disclosure that specific food conversions afforded by the invention may employ subassemblies 1 and 2 and other preferred disclosed embodiments of the invention, in only one of the two said semi rotational or semi counter rotational pivotal directions to best match to a food types composition and conversion needs. Said semi rotational or semi counter rotational pivotal forces are further defined, when levied onto a food type 9, whereby respective axial opposing tine arrays 3a and 3b pivot outward from said parallel orientation to effect a foods shredding conversion and when said axial opposing tine arrays 3a and 3b pivot inward to effect a foods shearing conversion.

Said second intended use is further described whereby the user pivots said axially opposing subassemblies respective handle portions towards and away from another while they exist in said pivotal interconnected state, while said tine arrays 3a and 3b, pierce into the chosen food type 9. Said piercing, while the user levies sequential opposing mechanical pivotal forces onto the subassemblies 1 and 2 and amongst the chosen food type(s) 9, will allow for shredding and shearing compositional changes to take place. Repeated user sequencing of said second intended use allows for increasingly finer compositional changes in the food type 9. When a fruit, vegetable, or other food type 9 is includes a significant proportion of natural oils or water within their fibers, said repeated user sequencing allows the post conversion compositional state to be partially liquefied or puréed.

FIG. 3 illustrates said first preferred embodiment of the invention in a front view whereby first assembly 1 and second subassembly 2 are intersected amongst one another in the pivotally enabled interconnected state as depicted in FIG. 1. Respective tine arrays 3a and 3b are alternately nested in each other's open space arrays 7. Said subassemblies lowest distal tine array portions 4a and 4b, would be the first point of contact with an intersected food type 9. Once interconnected as shown, the first assembly 1 and the second assembly 2 will have accurate and deliberate tolerances amongst their tangencies. It is further envisaged by way of this disclose that said open spaces 7 may have differing dimensional widths and areas amongst alternate functional embodiments of the invention which will allow for optimized shredding, cutting, and shearing modalities to match with specific varieties of food types having differing compositional structures. Therefore, said open spaces 7 may have an optimal dimensional width and area for a meat shredding function and a differing dimensional width and area for a vegetable shredding function.

FIG. 4' and FIG. 4" illustrates two lateral sectional views of the pivotally enabled interconnected state that exists amongst said first subassembly 1 and said second subassembly 2. FIG. 4' depicts the comfort handle parts 6a and 6b, along with inner comfort handle parts 5a and 5b, along with a pair of screw fasteners 7 holding the said respective comfort handle parts to respective fork parts 1a and 2a. Fork parts 1a and 2a of the first subassembly 1 and the second subassembly 2 have an array of lateral tangency positions 8 formed at the origin said respective tine arrays 3a and 3b, which also form a pivotal tangency with the opposing subassembly tine array's upper portion at the plurality of tangency positions 11.

FIG. 4" illustrates a sectional view of the said subassemblies that differs from the FIG. 4' depiction, by way of an alternate method for fastening said comfort handle parts 5a to 6a and said comfort handle parts 5b to 6b. It is envisaged by this disclosure that alternate methods for said fastening may be accomplished through the interface of a dart-head, friction fit, or interference fit protrusion post and receptor hole designed into comfort handle parts 5a, 5b, or 6a, 6b respectively. Said alternate fastening methods will have said protrusion post 10a, extending through the subassembly's metal tool parts 1a or 2a, in which said post 10a would insert and lock into a receptor hole 10b on the opposite facing comfort handle 5a or 5b, and thus securing metal tool part 1a or metal tool part 2a between said comfort handle parts 5a, 5b, or 6a, 6b respectively. Said protrusion post 10a and receptor hole 10b in said comfort handle parts function as a fastening means similar to said screw fastener 10, whereby the each secure the three subassembly parts together to respectively form said first subassembly 1 and said second subassembly 2. Fasteners 10 and 10a would be employed in one or more places on said first subassembly 1 and on said second subassembly 2 so as to securely hold each of their respective subcomponent parts together. Said comfort handles 5a, 5b, or 6a, 6b, in other preferred assembly methods may be snapped, glued, ultrasonic welded, or rivet assembled to one another and have fork parts 1a and 2a respectively contained between their respective paired comfort handles. It is further envisaged by way of this disclosure that other assembly methods exist to allow for said comfort grips to be secured and in an alternate means, they may be integrally forged, molded into said fork parts 1a and 2a, or include only one molded handle part per subassembly.

FIG. 5 illustrates a bottom orthographic view of said pivotally enabled interconnected state for said first subassembly 1 and said second subassembly 2 comprised of their respective said tine arrays 3a and 3b interconnected in a axially opposing lateral facings, and whereby said open space arrays 7 exist amongst and between said tines arrays 3a and 3b and further define combined tangencies amongst said arrays.

FIG. 6 illustrates a side orthographic view for said first preferred embodiment of the invention depicting said first subassembly 1 and said second subassembly 2 in a fully open pivotal range limit for their said pivotally enabled interconnected state. Said fully open pivotal range limit is comprised of said respective tine arrays 3a and 3b and said respective handle portions existing in a furthest axial opposing pivotal distance to one another. The previously disclosed pivot and fulcrum mechanics exists at the depicted tangency position 8 and tangency position 11, and are formed by tangencies existing amongst upper portions of respective tine arrays 3a and 3b and their intersection amongst respective open space arrays 7 and wherein said tangencies occur at the respective origins of each said array.

FIG. 7 depicts a side orthographic view for said preferred embodiment of the invention illustrating said first subassembly 1 and said second subassembly 2 in a fully closed pivotal range limit for said pivotally enabled interconnected state. Said fully closed position is comprised of said respective tine arrays 3a and 3b and said respective handle portions being in a closest opposing pivotal distance to one another.

FIG. 8 depicts a side orthographic view for the said first preferred embodiment of the invention and illustrates said pivotally enabled interconnected state of said first subassembly 1 and said second subassembly 2 whereby said tine arrays 3a and 3b are comprised of a perpendicular orientation to the ground plane, and whereby respective tine arrays 3a and 3b are intersecting into the axially opposing subassembly's respective open space array 7.

FIG. 9 illustrates a front orthographic view for said first preferred embodiment of the invention in said pivotal enabled interconnected state whereby said respective tines arrays 3a and 3b are also depicted in a perpendicular orientation to the ground plane. Said pivotally enabled interconnected state further comprises open spaces 7 existing when said subassemblies 1 and 2 are interconnected.

It is further envisaged by way of this disclosure that additional subassemblies may be introduced and paired to either said first subassembly 1 or said second subassembly 2, whereby said newly axially opposing paired subassemblies will comprise a modified pivotally enabled interconnected states which include differing profiles and contour areas amongst respective said open spaces 7 and respective tine arrays 3a and 3b at the tangencies of respective opposing tine arrays. Said introduction of additional subassemblies allow the user a plurality of interconnected axial opposing pairing options amongst said subassemblies, whereby a matrix of user chosen axial opposing pairings exist further allowing for a plurality of differing compositional conversions to be levied onto chosen food types.

FIG. 10 illustrates a perspective view of said first subassembly 1 and said second subassembly 2 depicted in said disconnected state to one another and further comprised of respectively comfort handle parts 6a, 6b, 5a, and 5b, and respective said tine arrays 3a and 3b each having a an offset lateral location to their origin points on respective said fork parts 1a and 2a. Said differing respective lateral locations of said respective tine arrays 3a and 3b allow for said pivotally enabled interconnected state to exist as illustrated in FIGS. 1 through 9. Said differing respective lateral locations can be further defined as an interconnected condition whereby each of said subassembly's plurality of singular tines, intersects into the axially opposing open spaces 7 of the longitudinally oriented opposing subassembly. FIG. 10 also depicts the handle portion's respective open spaces 7b of both said first subassembly 1 and said second subassembly 2 which allow for a user's fingers to intersect and grip onto the comfort handle portions of said subassemblies.

FIG. 11 illustrates said first subassembly 1 and said second subassembly 2 in an optimal orientation to one another to be employed in the first intended use for said invention whereby differing forces are levied upon a chosen food type(s). Said first intended use is comprised of said subassemblies 1 and 2 existing in a disconnected, axial opposing, substantially mirror image orientation to one another, whereby said respective tine arrays 3a and 3b, and said respective open space arrays 7, do not exist in a mirror image orientation to one anther but are laterally shifted to allow each said tine array 3a and 3b to fully intersect into the respective axial opposing open space array 7. Said first intended use is further described whereby the user motions said subassemblies 1 and 2 linearly towards and linearly away from another, while said respective tine arrays 3a and 3b, pierce into the chosen food type 9 and whereby said tine arrays 3a and 3b may also intersect with each said subassemblies respective said open space arrays 7. Said user motions and directional forces employed in the first intended use are comprised of substantially linear directional forces. Said piercing and linear opposing directional user forces applied onto said chosen food type 9 allow the food to achieve a desired composition change. Repeating said piercing and said linear opposing directional user forces onto said food type 9 allow the food to achieve an increasingly finer composition whereby it becomes more tender and palatable for consumers.

FIG. 12 illustrates said first subassembly 1 and said second subassembly 2 in a disconnected state to one another and in a perspective view oriented to have the substantially common lateral pivot axis, amongst said subassemblies, extending vertically. The depicted orientation of said subassemblies is only for diagrammatic purposes and not to imply an orientation for food conversion functionality amongst said subassemblies.

FIG. 13 and FIG. 14, illustrates a second preferred embodiment for the invention whereby a first subassembly a1 intersects with the opposing second subassembly a2 to form a modified pivotally enabled interconnected state with respective open spaces a8 and open spaces b8 simultaneously allowing for the lateral intersection of proximal mid plane area a9 of assembly a1 and mid plane area b9 assembly a2. Said intersecting secures said subassemblies in the pivotally enabled interconnected state. Said pivotally enabled interconnected state of said assemblies is further comprised of their respective handle portion's comfort handle parts 6a, 6b, 5a, and 5b existing in a lateral alignment.

FIG. 15 and FIG. 16 illustrates a third alternate preferred embodiment for the invention depicted in said pivotally enabled interconnected state and being comprised of substantially similar subassembly member parts as disclosed in the said first preferred embodiment of the invention, but wherein differences exist amongst singular tines of their tine arrays 3a and 3b. Said tine arrays 3a and 3b are comprised of a narrow lateral face as compared to that of their axially oriented faces, and wherein said narrower lateral face is in an inverse proportion to the said first preferred embodiment for the invention. Other differences embodied in subassemblies b1 and b2 include additional shared pivotal tangencies amongst pairs of axially opposing respective singular tines, and the addition of a plurality set of first and second cutting edge arrays 3c, 3d or 3c', 3d'. Said pairs of axially opposing respective singular tines have tangencies amongst pairs of inner facing planar surfaces 3aa and 3bb which are deposed perpendicular to said substantially common lateral pivot axis, wherein said respective tine arrays 3a and 3b are further comprised of a plurality respective laterally opposing first cutting edge arrays 3c and 3d. A singular cutting edge of said respective first cutting edge array 3c or 3d array exists on respective singular tines at the tangency of said inner facing planar surfaces 3aa or 3bb to respective singular laterally planar faces of a respective laterally planar face array 3a" or array 3b" or respective laterally planar face array 3a"" or array 3b"". It is envisaged that a second respective opposing cutting edge array may exist on said singular tine's axially opposing orientation, wherein in total comprise a respective second cutting edge array 3c' or array 3d'. The existence of said respective second cutting edge array 3c' or array 3d' allow said subassemblies to have both a semi rotational and a semi counter rotational severing forces to levy onto a chosen food type. Said subassemblies b1 and b2, being comprised of only one set of the two said respective cutting edge arrays 3c, 3d or 3c', 3d' would have a mono semi rotational severing means to be employed while converting a chosen food type. Said cutting edge arrays 3c, 3d or 3c' and 3d' allow for increased cutting exposure to be levied onto a food type that exist amongst their combined pivotal tangencies during said dynamic sequencing of subassemblies b1 and b2. Also depicted is a plurality of open spaces 7 located between pairs of axially opposing subassemblies' laterally adjacent singular tines of said respective tine arrays 3a and 3b. A plurality of minimum open space 7' also exists at the tangencies of said inner facing planar surfaces 3aa and 3bb. Said minimum open spaces 7' become a dynamic closed compressional tangency between said pairs of respective cutting edge arrays 3c, 3d or 3c', 3d' at points of rotational tangencies that exist during said pivotal semi rotational and semi counter rotational sequencing. Said dynamic closed compressional tangency exists when user applied opposing radial forces are levied onto respective said handle portions existing in said pivotally enabled interconnected state.

FIG. 16 illustrates said first subassembly b1 and said second subassembly b2 depicted in said pivotally enabled interconnected state in a perspective view whereby said respective opposing cutting edge array 3c and 3d are depicted and said subassemblies are oriented in a substantially closed, vertical oriented, pivotally enabled interconnected state. Said subassemblies b1 and b2 are comprised of respective open spaces 7b to allow for the intersection of user's hands to in turn secure to comfort handle parts 6a, 6b, 5a, and 5b. Respective fork parts bb1 and bb2 are also depicted which contain said respective opposing cutting edge array 3c and 3d, whereby said cutting edges have dynamic tangencies during the symmetrically opposing rotational sequencing of the said assemblies to allow the cutting and shearing of the food type. A chosen food type 9b is illustrated in a preferred orientation of existing on a food preparation surface below said first subassembly b1 and said second subassembly b2. Said food type 9b is depicted as a leafy vegetable which is a preferred food conversion choice for the pivotally enabled interconnected state of said embodiment. It is further envisaged that other food types that are compositionally similar to a leafy vegetable, such as herbs, can be successfully converted by said embodiment in said pivotally enabled interconnected state.

FIG. 17 illustrates said first subassembly b1 of a modified third preferred embodiment for the invention further comprised of the inclusion of a plurality of laterally opposing interference nodes 8b and 8c. Said interference nodes 8b and 8c are oriented in lateral opposition to one another amongst the plurality of open spaces 7 and exist in a close proximity to said tangency 8 areas, whereby they protrude laterally into said open space arrays 7. Said nodes 8b and 8c function to pivotally secure said subassembly b2 in a modified pivotally enabled interconnected state and wherein they are employed in the dynamic pivotal sequencing amongst said subassemblies b1 and b2.

FIG. 18 illustrates said first subassembly b1 and said second subassembly b2 depicted a disconnected state whereby a chosen food type 9 is shown. Said opposing cutting edge array 3c and 3d and respective laterally planar face array 3a" or array 3b" are also depicted. Said first subassembly b1 and said second subassembly b2 are oriented to be employed in a food conversion whereby said subassemblies would be pulled and pushed in opposing linearly directions while engaged into the food type 9 to perform a desired food conversion.

FIG. 19 illustrates said first subassembly b1 and said second subassembly b2 depicted in said pivotally enabled interconnected state and in a side orthographic view wherein said subassemblies b1 and b2 exist in a fully open pivotal range limit. Also depicted is said respective tine arrays 3a and 3b whereby each singular tine of said tine arrays are comprised of the inclusion of respective laterally opposing first cutting edge array 3c array 3d and respective laterally opposing second cutting edge array 3c' and array 3d'.

FIG. 20 illustrates said first subassembly b1 and said second subassembly b2 depicted in said pivotally enabled interconnected state, depicted in a side orthographic view. Said subassemblies are seen in a fully closed pivotal range limit. Also depicted are said respective laterally opposing cutting edge arrays 3c and 3d. Said respective laterally opposing cutting edge array 3c and 3d provide an enhanced function for the invention, whereby it may now be employed to cut predominately leafy vegetables, herbs, and foods types with a thinner compositional structure, whereby it is desirable for the food types to be severed into smaller pieces. FIG. 20, also depicts said respective handle portions 6a, 6b, 5a and 5b which have an opposing offset distance to one another and laterally between their axial opposing substantially central lateral handle portions. Said opposing offset distance allows for a secure user handgrip during range of motion pivot limits that exist between said subassemblies b1 and b2.

FIGS. 21, 22, 23, 24, and 25 illustrates a fourth preferred embodiment for the invention whereby a tine array 3a', of first subassembly 1', now intersects with the corresponding axially opposing second subassembly 2' at a plurality of open space arrays 7c located on said second assembly 2'.

Said subassembly 1' and 2' are further comprised of respective fork parts 1'a and 2'a which in their preferred embodiment, are manufactured of nickel-plated hardened steel or stamped stainless steel. It is within the scope of this disclosure that alternate preferred materials and manufacturing processes exist and may be considered when specifying materials and processes for any of the preferred embodiments of the invention disclosed within. Once said tine array 3a' intersect with subassembly 2' at said open space array 7c, subassemblies 1' and 2' are oriented in a pivotally enabled interconnected state which is best depicted in FIGS. 22, 23, 24 and 25.

FIG. 23 illustrates said subassemblies 1' and 2' in a pivotally enabled interconnected state having said subassemblies existing in a fully open pivotal range limit. Also depicted is a said food type 9 in a preferred orientation for the said embodiment of the invention to perform a compressional food conversion task. Said pivotally enabled interconnected state affords the user a mechanical lever to be levied onto a chosen food type and said mechanical lever utilizes a pivotal surface and fulcrum edge surface located on said respective subassemblies at positions 8 and position 11 tangencies found within said plurality of open spaces 7c. Said mechanical lever of said pivotally enabled interconnected state allows for a more efficient and easier means of converting compositionally tougher food types. As with the first preferred embodiment of the invention, this second preferred embodiment of the invention allows for both first intended use and a said second intended use conversion modalities to be levied onto food types. Said second intended use of said pivotally enabled interconnected state of said subassemblies 1' and 2', allows of for a finer conversion to the compositional nature of chosen food types through repeating this pivotal mechanical shredding.

FIG. 24 illustrates said first subassembly 1' and said second subassembly 2' in a front orthographic view whereby said subassemblies exist in their pivotally enabled interconnected state.

FIG. 25 illustrates said first subassembly 1' and said second subassembly 2' whereby they exist in said pivotally enabled interconnected state further comprised of said subassemblies having a closed opposing vertical orientation to one another and existing in a fully closed pivotal range limit of their said pivotally enabled interconnected state.

FIG. 26 illustrates said first subassembly 1' and said second subassembly 2' seen in a partial exploded view which depicts said tine array 3b' of said second subassembly 2' vertically oriented above said first subassembly 1' and centered above said open space array 7c of said second subassembly 2'.

FIG. 27 illustrates a disconnected underside perspective view of said first subassembly 1' said second subassembly 2' existing in a disconnected state and being comprised of said respective tine arrays 3a' and 3b' whereby said second assembly 2' is further comprised of said space array 7c in which accepts said tine array 3b in a full intersected state to allow for said pivotally enabled interconnected state amongst said subassemblies.

FIG. 28 illustrates said first subassembly 1' said second subassembly 2' in a pivotally enabled interconnected state whereby said assemblies exist in a fully open pivotal limit amongst said subassemblies whereby the tine array 3a' intersects the open space array 7c located on the fork part 2'a. Said tine array 3a exists in a matching longitudinal orientation to that of said opposing respective open spaces 7. Also depicted is the food type 9 oriented in an optimal central position below the invention.

FIGS. 29, 30, 31, 32, 33 and 34 illustrates a fifth preferred embodiment for the invention comprised of three to four injection molded plastic parts; a first member part 1''', a second member part 2''', a linear axle 14a being a third member part, and an axle retainer 15 as being an optional fourth member part. Said axle retainer 15 can be eliminated from said third preferred embodiment of the invention when said linear axle 14a independently secures to one of the two said first or said second member parts while all members are inter-secured. Axle part 14a has a disk shaped distal ending that forms a stop for it's insertion amongst said member parts 1''' and 2''''. It is envisaged by way of this disclosure that a forcible snap-fit retention means of said independent securing may exist which is allowed by an integrally molded interference rib(s) securing to the outside longitudinal face of axle pivot ring 15b as seen in FIG. 29 on said second member part 2'''. Said securing would be achieved by a modified linear axle part 14a' and as is depicted in FIG. 41. It is envisaged that other alternate methods for said independent securing means exist and may be employed, one of which would include said member parts having an integrally molded screw helix fastening means amongst said member parts whereby a modified third member part would include an axle fastener which includes a screw thread.

FIG. 29 depicts an underside perspective view of the fifth preferred embodiment for the invention comprised of said member part's disclosed above paragraph and illustrating respective tines arrays 3a and 3b, open spaces 7, along with an integrally molded plurality of respective axle pivot containment rings described as axle containment ring arrays 15a and 15b.

FIG. 30 depicts a front view for the said fifth preferred embodiment of the invention comprised of through hole open spaces 7, located singularly amongst individual said first member part 1''' and the second member part 2'''. Open spaces 7b allow the user's hand to intersect and grip to handle portions 6a and 6c. Respective tine arrays 3a and 3b, along with said respective axle containment ring arrays 15a and 15b are also depicted.

FIG. 31 depicts an exploded view of said fifth preferred embodiment of the invention comprised of four injection molded plastic parts; a first member part 1''', a second member part 2''', a linear axle 14a being a third member part, and an axle retainer 15 fourth member part. Said linear axle 14a, has distal portion 14c that functions as a limit stop for it's axial insertion which exists during a pivotally enabled interconnected state amongst said subassemblies. Said fifth preferred embodiment is also comprised of an array of axle containment rings 15a which are molded into said member part 1''' and an array of axle containment rings 15b which are molded into said member part 2'''. Both axle containment ring arrays 15a and 15b allow said linear axle 14a to be centrally intersected amongst them through open spaces 19 and 14 when said spaces are axially aligned. Said alignment and intersection engages first member part 1''' and the second member part 2''' in their assembled pivotally enabled orientation as seen in FIG. 34.

FIG. 32 illustrates two lateral sectional views of said fifth preferred embodiment of the invention comprised of said member part's disclosed above as seen in a fully open and a fully closed pivotal range limit for the pivotally enabled interconnected state existing between said first member 1''' and said second member part 2'''. Said member parts are comprised of injection molded plastic parts with said handle portions 6c and 6d being cored out to relieve said handle's material density. Said handle portion 6d is connected integrally to the lower portion of said second member part 2''' by handle transition portion 16b, and said handle portion 6c is connected integrally to the lower portion of said first member part 1''' by handle transition portion 16a. Each said member part 1''' and said member part 2''' are molded as an integral plastic part containing respective said handle portions 6c and 6d, respective said tine arrays 3a and 3b, and respective said axle containment rings 15a and 15b. Each said subassembly is further comprised of an air space 7b whereby the users fingers would intersect during use. Each said handle portions 6c and 6d, have a recessed void 17 on their topmost edge so as to allow for an ergonomic recessed grip area for the user's thumbs to engage into when pivoting said handle portions 6c and 6d apart from one another. Said pivoting apart will cause said respective tine arrays 3a and 3b to move towards one another which in turn levies compressional food conversion forces onto a chosen food positioned amongst and between said tine arrays 3a and 3b. An inverse food conversion also exists when respective tine arrays 3a and 3b are user motioned by way of user applied inward pivotal forces onto said handle portions 6c and 6d which in turn causes said tine arrays 3a and 3b to move apart from one another and levy a shearing force onto the foods.

FIG. 33 illustrates a bottom orthographic view of said the fifth preferred embodiment of the invention containing respective said axle containment ring arrays 15a and 15b, respective said tine arrays 3a and 3b, and a plurality of open spaces 7 located between the respective individual tines of tine arrays 3a and 3b which comprise respective open space arrays 7. Said open space arrays are further comprised of individual singular open spaces which are located between respective adjacent individual tines of said tine arrays 3a and 3b. Said respective open spaces arrays 7, allow the opposing subassembly's tine array to pivotally intersect into as depicted in the left sectional view of FIG. 32.

FIG. 34 illustrates a perspective view for of said fifth preferred embodiment of the invention comprised of said member parts 1'''' and 2'''', handle portions 6c and 6d, said respective open spaces 7b, and respective stiffening ribs 18a and 18b. Said stiffening ribs 18a and 18b function to strengthen the connection between the upper and lower portions of respective said member part 1''' and member part 2''. Said respective stiffening ribs 18 and 18b are located amongst said handle transition portions 16a and 16b and the outermost axle containment rings of the said axle containment rings arrays 15a and 15b and also function to more efficiently direct the user levied forces originating at said handle portions 6c and 6d onto a chosen food type 9.

FIGS. 35, 36, 37, and 38 illustrates a sixth alternate preferred embodiment for the invention being comprised of said members parts as disclosed in the above said fifth preferred embodiment of the invention, along with newly introduced member parts being comprised of a plurality of laterally planar, hardened steel tine inserts. Said steal tine inserts in plurality exist as respective steel tine insert array 18c and steel tine insert array 18d and are securely fastened to respective tine arrays 3a and 3b, which are in turn integral to respective first member part 1'''' and second member part 2''''.

FIG. 35 depicts a top orthographic view of the first member part 1'''' and the second member part 2'''' as seen in a fully open pivotal location of their respective handle portions 6b and 6c, and further comprised of opposing respective open spaces 7b, respective axle containment ring arrays 15a and 15b, pivot axle 14a, respective handle portions 6a and 6b and said handle recessed voids 17, which aid in allowing the user to easily pivot open a closed orientation for said embodiment of the invention.

FIG. 36 depicts two perspective views for said sixth alternate preferred embodiment for the invention comprised of the first member part 1'''' and the second member part 2'''' existing in a pivotally secured state to one another and being secured by the linear axle 14a. Also shown are respective open spaces 7b, respective tine arrays 3a and 3b, respective steel tine insert arrays 18a and 18b, along with respective open space arrays 7, located between the intersecting and opposing said steel tine insert arrays 18a and 18b. Said steel tine insert arrays 18a and 18b are positioned to allow said open space arrays 7 to be comprised of highly precision tolerances amongst their tangencies, which allow for the desired shredding and shearing food conversions, along with their new ability of cutting through the compositional fibers of a food type. Said cutting would be employed when said steel tine insert arrays 18c and 18d pivot at a close lateral tangency to one another. It is envisaged by this disclosure that this said sixth alternate preferred embodiment of the invention would function best when employed to convert pre-sliced supermarket deli style meats, lettuce, herbs and thin or thick leaf plant foliage.

FIG. 37 and FIG. 38 illustrates two section views for said sixth alternate preferred embodiment for the invention, showing a full pivotally closed and full pivotally open range limits for said member parts 1'''' and 2''''. The FIG. 37 sectional view depicts said fully open orientation and FIG. 38 sectional view depicts said fully closed orientation of said member parts 1'''' and 2''''. A food conversion sequence for this embodiment would first be comprised of the user pivoting closed the handle portions 6b and 6c of said member parts 1'''' and 2'''' to in turn simultaneously effect said steel tine insert arrays 18c and 18d to be pivoted fully apart from one another, and next the user would insert their distal end portions around a chosen food type, and next forcibly pivot the handle portions 6b and 6c to fully open pivotal orientation, causing said steel tine insert arrays 18c and 18d to cut through, mince, shear, or shred a food type located between the compressional forces at the intersection of said respective opposing steel tine insert arrays 18c and 18d. User applied oppositional pivotal forces levied onto said handle portions 6b and 6c allow for pivotal sequencing which allow food types 9 to be converted to a finer compositional state.

FIG. 39 illustrates a side orthographic view for the sixth alternate preferred embodiment of the invention depicting said tine arrays 3a and 3b, and said singular steel tine inserts of said steel insert tine arrays 18c and 18d. Also depicted is plurality of chamfered end portions contained on each singular tine's distal portion. Said chamfers are further defined as being chamfer arrays 17 of respective said member part 1'''' and said member part 2''''. Said chamfer arrays 17 ensure that the invention's opposing steel tine insert arrays 18c and 18d make contact onto chosen food types and also onto a chosen food preparations surface during pivotal use and are not interrupted by the tine arrays 3a and 3b distal ends.

FIG. 40 illustrates a front orthographic view for the sixth alternate preferred embodiment of the invention and depicts the introduction of a plurality of assembly screws 19 along with tine distal arrays distal 4a' and 4b'. Assembly screws 19 secure said steel tine inset arrays 18c and 18d to said member parts 1'''' and 2'''' at respective tine arrays 3a and 3b. It is also envisaged that the steel tine inset arrays 18c and 18d may be secured in several alternate means, such as the securing being achieved through said tine inset arrays 18c and 18d being insert molded into the said tine arrays 3a and 3b's plastic composition, or may they may be forcibly snapped into place at the factory, or be secured at the factory through a heat-stacked assembly means, or be integrally die case metal when said member parts 1'''' and 2'''' are alternately die cast metal. All of the afore mentioned assembly means forgo the invention's need for the afore mentioned assembly screws 19. It is envisaged by way of this discloser that said fifth and sixth preferred embodiment of the invention can be comprised of alternate material(s) and alternate manufacturing means such as existing as die cast metals, and stamped, or machined metals.

FIG. 41 illustrates a disconnected proximal exploded view of the previously disclosed fifth preferred embodiment of the invention comprised of said first member part 1''', said second member part 2''', and an alternate embodiment for the removable linear axle part 14a'. A chosen food type 9 is depicted in a preferred orientation on centrally located food preparation surface and whereby the invention is ready to perform said first intended use. Said member part 1''' and 2''' have been disengaged from their pivotally enabled interconnected state depicted in FIG. 34, whereby said alternate linear axle part 14a' has been removed from said members 1''' and 2''' at axial pivot rings 15a and 15b. It is envisaged by way of this discloser that it may be desirable for a user to have the ability to dismount and reintroduce said linear axle part 14a' to said member parts 1" and 2" to allow for cleaning or allowing for said first intended use. Said disconnected state allows for the first intended use of the invention whereby the said subassemblies 1''' and 2''' are employed in a food conversion in a disconnected state and whereby they are pulled and pushed in opposing linear directions with broader sweeping actions being levied onto the chosen food type 9.

FIG. 42 illustrates a partial exploded view of the previously disclosed first preferred embodiment of the invention comprised of said first subassembly 1 and said second subassembly 2 existing in a disconnected state whereby said subassemblies have been disconnected from their pivotally enabled interconnected state depicted in FIG. 1 through FIG. 9. A chosen food type 9 is illustrated in a preferred orientation on a food preparation surface below said first subassembly 1 and second subassembly 2. The user's hands are also depicted in a preferred secured grip onto said respective comfort handle portions 6a, 6b, 5a and 5b whereby the user's fingers have intersected the respective assemblies open spaces 7b. Said disconnected state and said user grip allow for the first intended use for the invention whereby said first subassembly 1 and said second subassembly 2 are employed by the user to be pushed in opposing directions with broad linear sweeping actions levied onto the chosen food type 9. Said sweeping actions are in opposing directions, or may employ one subassembly to anchor the food type 9 to the food preparation surface, while the opposing subassembly is pulled or pushed while their said distal tines are inserted amongst or into said food type 9.

FIG. 43 illustrates two side orthographic views for the pivotally enabled interconnected state of said preferred first embodiment of the invention comprised of said first subassembly 1 said second subassembly 2. The right side orthographic view depicts the assembly tool as being further comprised of an outward extending offset distance between respective centers of respective handle portions measured to the shared central origin of respective tine arrays 3a and 3b at tangency position 8. When said subassemblies exist in said pivotally enabled interconnected state, said outward offset distance is doubled when measured between centers of respective handle portions. Said outward offset is especially necessary when said assemblies are used in their second intended use and said offset distance between their opposing central lateral handle portions will then allow for a secure hand grips that will not interfere with the desirable range of motion pivot limits that exist between said subassemblies 1 and 2. The orthographic side views depicted in FIG. 43 illustrate the same tool assembly in its fully open pivotal range limit whereby comparative geometries exist between this state and the adjacent right orthographic side view. Said comparative geometries illustrate equal distances that exist between the dynamic changes in vertical height between the distal handle portion and the distal tine arrays during said pivotal range limits and during a dynamic sequencing of the subassemblies 1 and 2. The tool assemblies handle distal handle portion will remain at a vertically constant distance to a user's food preparation surface during a food conversion task when the radial distances of the distal handles and the distal tine arrays is equal when each is measured to the substantially common lateral pivot axis. There is an inverse vertical height change between the distal tine arrays and the distal handle portions during said pivotal range limits and this proportionally inverse height change allows the users handgrip to remain at a substantially constant height to the food preparation surface, whereby the distal handle portions vertical change will negates the inverse vertical change of the distal tine arrays. This substantially constant user handgrip height on the tool assembly allows for increased manual dexterity during a food conversion task and these proportionally equivalent distances Y, exist throughout all pivotal ranges limits while said subassemblies 1 and 2 exist in said pivotally enabled interconnected state. It is envisaged by way of this disclosure that all the preferred embodiments of the invention disclosed within may include the aforementioned equal radial distances of their distal handle portions and their distal tine arrays when measured to the kitchen tools substantially common lateral pivot axis.

FIG. 44 depicts a partial exploded view of the said fifth preferred embodiment of the invention comprised of first subassembly 1' and said second subassembly 2' in a disconnected state whereby said subassemblies have been dismounted from afore depicted pivotally enabled interconnected state illustrated in FIG. 28. A chosen food type 9 is illustrated in a preferred orientation on a food preparation surface below said first subassembly 1' and said second subassembly 2'. Said disconnected state allows for the first intended use of the invention whereby said first subassembly 1' and said second subassembly 2' are employed by the user to be pulled in opposing directions while engaged into a food type 9 and thereby effecting a change in it's compositional structure.

FIG. 45 depicts a partially obstructed perspective view for the previously disclosed sixth embodiment of the invention being comprised of said first member part 1''' and said second member part 2'''' existing in a pivotally enabled interconnected state proximally within a newly introduced containment unit 21' assembly. Said assembly 21' is comprised of containment unit 21 along with a food retainer 20 whereby when secured together form a containment interconnected state. The sixth embodiment of the invention is shown in a preferred substantially central location within said containment unit 21 and positioned to provide the user with a new and embellished food conversion modality. This combined use state between said invention and said containment unit 21 allows for a food conversion utility amongst member parts whereby said food types 9 that are compressively contained by said food retainer 20 to radial inner surface 21C of the containment unit 21 and when said food type 9 is compressively secured inside said containment unit 21, a modified containment interconnected state exists.

FIG. 46 illustrates a sectional view including all the same food containment member parts disclosed in FIG. 45 in said containment interconnected state including said sixth preferred embodiment of the invention in a laterally central position 14' within said containment unit 21, and illustrates said food retainer 20 being further comprised of a plurality of arched ribs 20a which function to apply compressional forces onto the depicted chosen food type 9 which is secured between said containment vessel's radial inner surface 21c and said food retainer 20 by way of compressional forces existing at the plurality of arched parallel upstanding walls 20a which levy forces against the food type 9 at said wall's underside surface. Said arched parallel upstanding walls 20a are to be molded in a semi-rigid material such as defined by way of a food-safe plastic. In an alternate means, said walls may be comprised of a co-injection molded composition, whereby their lower portions are molded in a lower density and more pliable material such as silicone their upper portions molded in a denser food safe plastic, so as to allow for their controlled deflection when employing compressional forces onto said food types 9. Said deflection also allows for open space 23 to form between the lower tangency of said arched parallel upstanding walls 20a and the said vessels radial inner surface 21c. Said containment unit 21 is further defined as having a radius defining said radial inner surface 21c that is equal to the pivotal radius formed at said sixth preferred embodiment of the invention distal tine arrays' ends. The tangencies that exist along said pivotal radius to the radial inner surface 21c during a user initiated pivotal sequencing for the invention allow for a constant tangential engagement of said distal tine points to said radial inner surface 21c. Said laterally central location 14' is the origin point for both the pivotal articulation of the depicted sixth embodiment of the invention and for the radius that forms said radial inner surface 21c.

FIG. 47 illustrates an exploded view depicting all the member parts disclosed in FIG. 46, whereby the sixth preferred embodiment of the invention is depicted in a raised central orientation above said containment unit 21. Said food retainer 20 is also depicted with integrally molded said plurality of arched parallel upstanding walls 20a and open space channels 20b. Said containment unit 21 has two opposing sidewalls 21d that allow for lateral containment of a chosen food type 9. It is envisaged in this disclosure that said side walls 21d do not contribute to said enhanced food conversion functionality, other than to contain the food type 9 on the lateral extremes of said unit 21, and therefore a modified version of said containment unit 21 may exclude said sides walls 21d. Said elimination of said side walls 21d would allow said containment unit 21 to function with said invention by still employing the matched radius planar surface to effect the food type along with the same food securing functionality afforded by the said food retainer 20. It is further envisaged in this disclosure that said radial inner surface 21c may be alternately comprised of compound curves so as to more closely match to a shredding tools variations that may further be comprised of a plurality of tines 3a and 3b which comprise varying distal lengths.

FIG. 48 illustrates a sectional view of said containment unit assembly 21', with said containment unit assembly 21, said food retainer 20. Said food retainer 20 is depicted as having a plurality of arched parallel upstanding walls 20a and depicted without an inserted food type. Said plurality of arched parallel upstanding walls 20a have an underside surface tangency to portions of the radial inner surface 21c of containment unit 21 when food retainer 20 is retained to containment unit 21 without a food type 9 interference. Food retainer part 20 has two opposing handles 20c that interface with two or more interference snap ribs 22 molded into said containment unit 21 allowing food retainer 20 to snap in place and securely locate onto said containment unit 21. Food retainer 20 will remain secured to containment unit 21 while upward forces exist and are levied against said retention snaps ribs 22 while they securing a chosen food type 9 to said containment unit 21 at said radial inner surface 21c.

FIG. 49 depicts a sectional view for an alternate embodiment of containment unit 21 as seen in a single member containment unit 21", along with a centrally oriented said sixth preferred embodiment of the invention, in which the food retainer part 20 of FIG. 45 through FIG. 48 has been eliminated and replaced with a newly introduced plurality of equally spaced-apart, parallel upstanding walls 21e which are molded as being integral to said containment unit 21" and extend upward from said radial inner surface 21c. Said plurality parallel upstanding walls 21e function to raise a leafy style food type 9b above said containment unit 20" radial inner surface 21c and allow for a deeper engagement of said tine arrays 3a and 3b onto the chosen food type 9. Said radial inner surface 21c is located in a central proximity on said containment unit 21", and comprised of a radius matching to that of the radii existing for the distal tine points radial motion arc during the dynamic pivotal sequencing. As said radial inner surface(s) 21c laterally extend from said central proximity towards the outward rim of said containment vessel 21", they become more linear. It is envisaged by this disclosure that said containment units 21, 21", 21'" and the yet to be disclosed vessel containment unit 21"" may contain interior surfaces that are linear and not arched, requiring the user to manipulate said tools in differing ways or as they would on a typical food preparation surface 9'.

FIG. 50 illustrates a sectional view for an alternate embodiment of containment unit 21 as seen in a single member vessel 21'", along with a centrally oriented said third preferred embodiment of the invention, which also eliminates food retainer 20 and in place of it introduces a plurality of equally spaced-apart, parallel upstanding walls 21f which are molded integral to said containment unit 21'". Said plurality equally spaced-apart, parallel upstanding walls 21f function to raise a chosen food type 9 above said containment unit 21" radial lower surface 21c and allow for a further increased engagement of said respective tine arrays 3a and 3b into said chosen food type 9. Said radial inner surface 21c is to have a radius matching to that of the said distal tine arrays end points radius exhibited during their range of motion arc. Said laterally central location 14' is the origin point for both the articulation of the all disclosed embodiments of the invention and for the radius that forms said radial inner surface 21c.

FIG. 51 illustrates a lateral sectional view for the fifth embodiment of the invention and being comprised of said member part 1'" and said member part 2'" pivotally interconnected along with introducing a new modification to said containment unit 21 whereby it now includes the addition of a plurality of integrally molded equally spaced-apart, parallel upstanding walls 21g and is configured now as existing as containment unit 21"". Said containment unit 21"" is comprised of the addition of a plurality parallel upstanding walls 21g, which are depicted being laterally spaced so as to match to the tangency of the secured food retainer 20. Said matched tangency exists at the plurality of parallel upstanding walls 20a having downward facing surfaces that contact to said plurality parallel upstanding walls 21g upward facing surfaces. An enhanced food conversion function exists when said invention is centrally positioned inside said containment unit 21"" and a user engages said preferred embodiments of the invention. Said food retainer 20 is comprised of said plurality of arched parallel upstanding walls 20a whose said plurality of open spaces 20b are located between said parallel upstanding walls 20a, further allowing the inserted said tine arrays 3a and 3b to align and be guided against during the symmetrically opposing rotational sequencing amongst said subassemblies. Said food retainer part 20 is depicted in a modified containment interconnected state secured to containment unit 21"" whereby it performs a function of securing a food type 9 between the upward facing surfaces of the plurality of integrally molded parallel upstanding walls 21g and to the downward facing surfaces of the insert retainers said plurality of parallel upstanding walls 20a.

Said plurality of arched parallel upstanding walls 20g, function to raise the depicted chosen food type 9 above said containment unit's radial inner surface 21c, allowing for an enhanced engagement and penetration of the said tine arrays 3a and 3b amongst and into said chosen food type 9 during a food conversion sequence. In this depiction, said tine arrays 3a and 3b are not yet penetrated amongst said food type 9, but are located above the said food type 9, as they would exist just prior to their engagement. Said food retainer 20 is further comprised a plurality of arched parallel upstanding walls 20a and a plurality of open space channels 20b located between singular arched ribs of said plurality ribs. Said parallel upstanding walls 21g are vertically aligned to said arched parallel upstanding walls 20a when said food retainer is secured to said containment unit 21''''. Said securing allows the distal end of tine arrays 3a and 3b to be laterally guided during a food conversion sequence along with said securing a chosen food type 9 to said containment unit 21''''.

FIG. 52 illustrates a side orthographic view for an alteration to said preferred first embodiment of the invention comprised of a newly introduced raised post 5c which is laterally central to said handle portion 5a and also includes a newly introduced recessed cavity void 5d located laterally central to said handle 6b. Said post 5c and said recessed cavity void 5d allow respective subassemblies 1 and 2 to securely locate to one another at their handle portions, maintaining a friction-fit between the manufactured tolerances that exist between said handle parts 5a and 6b and whereby a more efficient storage means exists amongst said subassemblies 1 and 2 further comprising a static interconnected state.

FIG. 53 depicts a front orthographic view of a modified version of the first preferred embodiment for the invention whereby said tines 3a and 3b have distal end portion's comprised of newly introduced laterally protruding profiles 3a' and 3b' which intersect laterally between respective singular tangential tines and comprise the lateral extremities of their respective tine arrays 3a and 3b. Singular tines of said tine arrays 3a and 3b said laterally protruding edges intersect into inversely shaped lateral open space 7'' at the tangency of said protruding edges to adjacent singular tines. The plurality open spaces 7'' are to be manufactured with a precise gap tolerance to as to allow for desirable food conversions. Said intersections allow for customized cutting, shredding and shearing forces to be levied onto specific food types 9, and further allowing for customized food conversion results.

FIG. 54 depicts a front orthographic view of an alternate preferred sixth embodiment of the invention previously depicted in FIG. 35 through FIG. 40, whereby said steel tine insert arrays 18e and 18f are secured to tine arrays 3a and 3b and are comprised of newly introduced laterally protruding profiles 3a' and 3b' which intersect laterally between respective singular tangential tines. Singular tine inserts of said steel tine insert arrays 18e and 18f said laterally protruding edges intersect into inversely shaped lateral open space 7'' at the tangency of said protruding edges to adjacent singular tine inserts. The plurality open spaces 7'' are to be manufactured with a precise gap tolerance to as to allow for desirable food conversions. Said lateral intersections depicted in both FIG. 53 and FIG. 54 allow said respective subassemblies and members to apply shredding and shearing forces to a chosen food type 9 which more closely match said foods compositional structure and also allow for a specific visual, textural, or post-shredding compositional change to take place. It is envisaged that said lateral intersection variations could be incorporated into all said preferred embodiments for the invention disclosed. It is envisaged by way of this disclosure that said gap tolerance is to be manufactured to match to the cutting, shredding, and shearing needs of specific food types or to their desired post converted compositional state.

FIG. 55 illustrates a front orthographic view of a preferred seventh embodiment of the invention which is comprised of upper portions similar to that of the previously disclosed fifth and sixth preferred embodiment for the invention, but differ on the lower portions with the addition of a plurality of u-shaped, hardened steel or stainless steel strap-like tines contained within respective tine arrays 19a and 19b and which are positively secured to respective first and second subassemblies b1' and b2' at extension arrays 8a and 8b. The tine arrays 19a and 19b have a plurality of singular open spaces 7d, with each said open space 7d located inside of each singular strap-like tine. It is envisaged that the fastening of said singular tines to their respective singular extensions of said extension arrays 8a and 8b, would be achieved through insert molding, pinning, screwing, friction fitting, or other factory means that ensure the parts hold steadfast together. It is envisaged by way of this disclosure that the gap tolerance amongst adjacent singular opposing tines of said tine arrays 19a and 19b, may be adjusted by the consumer in an alternate embodiment so as to allow for customizing the shearing effects to match to a specific food types needs.

FIG. 56 illustrates said first subassembly b1' and said second subassembly b2' depicted in a perspective view and in a pivotally enabled interconnected state further comprised of respective opposing cutting edge array 3a' and 3c', and cutting edge array 3b' and 3d' wherein both said cutting arrays are located on the leading edges of the u-shaped strap tines of said tine arrays 19a and 19b. Subassemblies b1' and b2' are depicted in a fully closed pivotal range limit and oriented in vertical symmetry whereby their respective handle portions 6a and 6b are depicted fully open. Said subassemblies b1' and b2' are also further comprised of opposing respective handle open spaces 7b, respective integrally molded axle containment ring arrays 15a and 15b, pivot axle 14, and handle recessed voids 17. Said handle recess voids 17 aid in allowing the user to easily pivot open a closed respective handle orientation for said embodiment of the invention. Pairs of cutting edge arrays 3a' and 3b' exist on singular tines of tine array 19a, and pairs of cutting edge arrays 3c' and 3d' exist on a singular tine of tine array 19b. Said pairs of respective tines of tine arrays 19a and 19b have dynamic tangencies during the symmetrically opposing rotational sequencing of the said subassemblies b1' and b2' to allow for cutting, gouging and shearing of the food type. A chosen food type 9b is illustrated in a preferred orientation while existing on a food preparation. Said food type 9b is further depicted as a squash type vegetable which is one of many preferred food conversion choices for this embodiment of the invention. Converted food type pieces 9c are also depicted in this illustration and are formed after a user has levied downward and pivotal forces from this embodiment of the invention onto said food type 9b. It is further envisaged that other food types that are compositionally similar to that of a squash can be successfully converted by this embodiment of the invention in both the said first intended use and the said second intended use described in the previously disclosed embodiments. Herbs and leafy vegetables could also be successfully converted through cutting and severing actions existing at the dynamic tangencies during the symmetrically opposing rotational sequencing of the said subassemblies. The existence of the pairs of said cutting edge arrays 3a' and 3b' and 3c' and 3d' on said tine arrays 19a an dl 9b allow for substantially similar food conversions as previously disclosed for the third preferred embodiment for the invention and as referenced in FIG. 15 through FIG. 20, with the added functionality of allowing for the newly disclosed food gouging and scooping out from the food type. Both a semi rotational and a semi counter rotational conversion forces may be levied onto a chosen food type for this seventh preferred embodiment of the invention. It is envisaged by way of this disclosure that an alternate embodiment may limit the cutting and gouging of the food types to being achieved with mono semi rotational forces, whereby only the inward facing cutting edge arrays 3c' and 3d' exist.

FIG. 57 illustrates said first subassembly b1' and said second subassembly b2' depicted in a perspective view and existing in a fully open pivotal range limit amongst subassembly member parts and wherein said assemblies b1' and b2' are in a preferred orientation for the dynamic pivotal sequencing to be levied onto a chosen food type.

FIG. 58 illustrates said first subassembly b1' and said second subassembly b2' depicted a disconnected state whereby a chosen food type 9 is also shown. Said respective opposing cutting edge array 3a' and 3c', and cutting edge array 3b' and 3d' are also depicted. Said first subassembly b1' and said second subassembly b2' are oriented to be employed in a food conversion whereby said subassemblies would be pulled and pushed in opposing linearly directions while engaged into the food type 9 which would be preferably located on a food preparation surface, such as a cutting board.

FIG. 59 illustrates said first subassembly b1' and said second subassembly b2' depicted in said pivotally enabled interconnected state and in a side orthographic view wherein said subassemblies b1' and b2' exist in a fully closed pivotal range limit. Also depicted is said respective tine arrays 19a and 19b whereby each singular tine of said tine arrays is comprised of the inclusion of respective opposing first cutting edge arrays 3a' array 3c' and respective axially opposing second cutting edge arrays 3b' and array 3d'.

FIG. 60 illustrates said first subassembly b1' and said second subassembly b2' depicted in said pivotally enabled interconnected state, depicted in a side orthographic view. Said subassemblies are seen in a fully open pivotal range limit. Also depicted is said respective tine arrays 19a and 19b whereby each singular tine of said tine arrays is comprised of the inclusion of respective opposing first cutting edge arrays 3a' array 3c' and respective axially opposing second cutting edge arrays 3b' and array 3d'. Said respective cutting edge array 3a' and 3c', and arrays 3b' and array 3d' provide an enhanced function for the invention, allowing it to employed to cut predominately leafy vegetables, herbs, and foods types with a thinner compositional structure, and also be employed to gouge-out food types and convert them to having strand-like, compositional structures. FIG. 60, also depicts said respective handle portions 6a and 6b which tangential to one another and in an axial opposing orientation. It should be understood at the outset that although illustrative implementations of one or more embodiments are illustrated below, the disclosed components and subcomponents may be implemented using any number of techniques, whether currently known or in existence. The disclosure should in no way be limited to the illustrative implementations, drawings, and techniques illustrated below, but may be modified within the scope of the appended claims along with their full scope of equivalents.

Having thus described the invention, what is claimed is:

1. A transformable food conversion device comprising: a kitchen tool assembly which includes a first subassembly and a second subassembly; and (A) The first subassembly is comprised of a distal first handle portion, a first tine array comprised of a plurality of food conversion tines, a first open space array comprised of a plurality of open spaces disposed laterally between adjacent singular tines of said first tine array, wherein said first tine array and said first open space array comprise a joint distal array existing in an opposing lateral proximal orientation to that of said distal first handle portion; and (B) The second subassembly is comprised of a distal second handle portion, a second tine array comprised of a plurality of food conversion tines, a second open space array comprised of a plurality of open spaces disposed laterally between adjacent singular tines of said second tine array, wherein said second tine array and said second open space array comprise a joint distal array existing in an opposing lateral proximal orientation to that of said distal second handle portion; and (C) whereby a first intended use is comprised of a disconnected state between said first subassembly and said second subassembly; and (D) whereby a second intended use is comprised of said first subassembly and said second subassembly attaching to one another to exist in a pivotally enabled interconnected state, wherein said subassemblies have axially opposing laterally faced orientations, both respective said tine arrays will exist in a lateral planar alignment during a rotation position of said pivotally enabled state; and (E) whereby said lateral planar alignment is further comprised of a substantially common lateral pivot axis between said subassemblies during said pivotally enabled interconnected state; and (F) whereby during said second intended use, a user levies opposing pivotal forces between said subassemblies in the form of sequential semi rotational and semi counter rotational pivoting about said substantially common lateral pivot axis whereby a dynamic sequencing exists between of said subassemblies; and (G) whereby said dynamic sequencing of said subassemblies further consists of opposing respective pivotal range limits between said interconnected subassemblies; and (H) whereby said substantially common lateral pivot axis is comprised of a lever-to-fulcrum mechanics amongst said interconnected subassemblies at shared lateral tangencies; and whereby said pivotally enabled interconnected state is further comprised of said first tine array and said second tine array having a lateral offset to one another, said lateral offset equal to half of the lateral distance between an adjacent pair of lateral tines existing on respective said tine array of respective said subassembly, and wherein each said subassembly's respective said handle portion exists in lateral symmetrical alignment to one another, wherein a shared perpendicular centerline exists between them; and (I) whereby each respective said open space array is comprised of a plurality of singular open space areas whereby a singular open space area exists between respective said adjacent pair of lateral tines, further existing between respective said subassembly's respective said tine arrays; and (J) wherein when employed in a food conversion task in either said first or said second intended use, said first subassembly's and said second subassembly's respective said tine arrays pivot to intersect into the open space arrays which exist between said first and said second subassembly, whereby food that exists between said tine arrays, during said dynamic sequencing, is compressed, shredded, and cut smaller; and (K) wherein said subassemblies existing in said pivotally enabled interconnected state can detach from one another for storage or to allow for said first intended use whereby said subassemblies exist in said disconnected state; and (L) wherein said subassemblies existing in said disconnected state can attach to one another to allow for said second intended use and whereby said subassemblies exist in said pivotally enabled interconnected state.

2. The device according to claim 1, whereby said second intended use is further comprised of an interdependent functionality between said subassemblies wherein respective said tine arrays and respective said open space arrays jointly convert a chosen food type disposed between an axially opposing respective said tine arrays into smaller pieces compositions when the user levies mechanical opposing pivotal tensile and/or compressional forces onto said subassemblies respective said handle portions.

3. The device according to claim 1 or claim 2, in which said singular tines of respective said tine arrays are further comprised of a u-shaped distal end portion comprised of a steel strap wherein said steel strap is further comprised of one or more outer cutting edges, whereby respective said outer cutting edges are laterally aligned to have a pivotal lateral offset intersection during said dynamic sequencing.

4. The device according to claim 1 or claim 2, in which an enhanced kitchen food conversion system is comprised of an additional food containment assembly configured to have an interdependence with said respective subassemblies; and (A) a food containment unit; and (B) a food retainer; and (C) whereby said food containment unit is comprised of a structure defining a contiguous top opening; and (D) whereby said food retainer is configured to intersect into said contiguous top opening and securely attach to said food containment unit and further comprise a containment interconnected state amongst said containment unit and said food retainer; and (E) whereby said food retainer is comprised of an integrally molded semi-rigid array of equally spaced-apart laterally parallel upstanding walls defined as a lateral wall array; and (F) whereby said food retainer is comprised of an array of equally spaced-apart laterally parallel open space channels defined as a lateral open space array, and disposed between pairs of laterally adjacent parallel upstanding walls of said lateral wall array; and (G) whereby lateral distances between pairs of adjacent said equally spaced-apart laterally parallel open space channels of said lateral open space array are equal to the lateral distance between respective axially adjacent opposing said singular adjacent tines.

5. The device according to claim 1, whereby said pivotally enabled interconnected state, is further comprised of respective said tine arrays and respective said open space arrays intersecting at a shared lateral origin, wherein said lever-to-fulcrum mechanics exists amongst said interconnected subassemblies.

6. The device according to claim 1, whereby said first subassembly's and said second subassembly's respective said distal handle portion is disposed at an opposing perpendicular offset distance from the location of said substantially common lateral pivot axis, wherein said opposing perpendicular offset distance exists to allow an open space for gripping when said subassemblies exist in said pivotally enabled interconnected state.

7. The device according to claim 6, whereby during said pivotally enabled interconnected state, respective said opposing perpendicular offset distances are further comprised of a combined perpendicular offset distance between said respective distal handle portions to allow for full pivotal range limits between said subassemblies while the user grips onto said handle portions.

8. The device according to claim 1, whereby employing said kitchen tool assembly in said first or said second intended use, respective said tine arrays of respective said subassemblies laterally align to intersect into respective said open space arrays, wherein the handle portions of respective said subassemblies remain in said lateral symmetrical alignment constituted by the sharing of said shared perpendicular centerline.

9. The device according to claim 1, whereby said kitchen tool assembly maintains said pivotally enabled interconnected state without the need for mechanical fasteners, and wherein said subassemblies remain positively secured to one another as the user levies pivotal compressional forces onto a food type located between or amongst said tine arrays.

10. The device according to claim 1, whereby said respective tine arrays existing in said pivotally enabled interconnected state are further comprised of a plurality of shared pivotal sequencing tangencies wherein pairs of opposing respective said singular tines have substantially laterally planar faces to one another, wherein said plurality of shared pivotal sequencing tangencies are comprised of respective opposing cutting edge arrays, and wherein a single cutting edge exists on respective ones of said singular tines, and wherein during said dynamic sequencing of said subassemblies within the pivotal range of opposing said cutting edge arrays, will sever a food type in compressional contact with said opposing cutting edge arrays.

11. The device according to claim 10, whereby respective said singular tines of said respective tine arrays are further comprised of a second respective cutting edge, located in respective symmetrically opposing edges of said singular tines, whereby a pair of two symmetrically opposing said cutting edges exist on each respective said singular tine, and whereby said dynamic sequencing of said subassemblies within their rotational pivotal limits will sever said food type in contact with either said symmetrically opposing cutting edges of respective said tine arrays through pivotal tensile and pivotal compressional forces levied against said food type.

12. The device according to claim 1, whereby said subassemblies secure to one another in a non-pivotal interconnected state for non-use storage, and wherein respective said distal handles portions, of said subassemblies, have one or more protrusions and one or more protrusion receptor open spaces that will align in respective opposition, wherein an interference fit exists between the intersection of said protrusions and said protrusion receptor open spaces of said opposing distal handles portions, allowing for a secure interconnection, which further comprise said non-pivotal interconnected state.

13. The device according to claim 1, whereby said pivotally enabled interconnected state is further comprised of a pivotal orientation, whereby said respective said tine arrays exist in a substantially planar orientation during a rotatable position of said dynamic sequencing.

14. The device according to claim 1, in which respective said tine arrays are further comprised of an additional plurality of laterally planar, respective steel tine insert which are singularly secured to respective singular tines of respective said tine arrays, and wherein increased cutting exposure is levied onto food types existing between respective said opposing steel tine inserts during said dynamic sequencing.

* * * * *